United States Patent
Wolff et al.

(10) Patent No.: US 12,528,504 B2
(45) Date of Patent: Jan. 20, 2026

(54) TRAJECTORY PLANNING BASED ON EXTRACTED TRAJECTORY FEATURES

(71) Applicant: Motional AD LLC, Boston, MA (US)

(72) Inventors: Eric McKenzie Wolff, Zephyr Cove, NV (US); Tung Minh Phan, Encino, CA (US); Ting-Sheng Chu, Malden, MA (US); Momchil Tomov, Waltham, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/808,943

(22) Filed: Jun. 24, 2022

(65) Prior Publication Data

US 2023/0415772 A1 Dec. 28, 2023

(51) Int. Cl.
| | | |
|---|---|---|
| B60W 40/02 | (2006.01) | |
| B60W 30/14 | (2006.01) | |
| B60W 50/00 | (2006.01) | |
| B60W 60/00 | (2020.01) | |
| G06V 10/82 | (2022.01) | |
| G06V 20/54 | (2022.01) | |

(52) U.S. Cl.
CPC ...... *B60W 60/0011* (2020.02); *B60W 30/143* (2013.01); *B60W 40/02* (2013.01); *B60W 50/0098* (2013.01); *G06V 10/82* (2022.01); *G06V 20/54* (2022.01); *B60W 2556/35* (2020.02); *B60W 2556/40* (2020.02)

(58) Field of Classification Search
CPC .......... B60W 60/0011; B60W 30/143; B60W 40/02; B60W 50/0098; B60W 2556/40; B60W 2556/35; G06V 20/54; G06V 10/82

USPC .......................................................... 701/23
See application file for complete search history.

(56) References Cited

U.S. PATENT DOCUMENTS

| | | | | |
|---|---|---|---|---|
| 11,157,010 | B1 * | 10/2021 | Narang | G05D 1/0219 |
| 11,181,926 | B2 * | 11/2021 | Shalev-Shwartz | G05D 1/0214 |
| 2013/0265424 | A1 * | 10/2013 | Zhang | G06V 10/809 |
| | | | | 348/148 |
| 2017/0123419 | A1 | 5/2017 | Levinson et al. | |
| 2017/0277193 | A1 | 9/2017 | Frazzoli et al. | |
| 2019/0034794 | A1 * | 1/2019 | Ogale | G06N 3/084 |
| 2019/0317512 | A1 | 10/2019 | Zhang et al. | |
| 2020/0110416 | A1 | 4/2020 | Hong et al. | |
| 2020/0401892 | A1 | 12/2020 | Redding et al. | |

(Continued)

FOREIGN PATENT DOCUMENTS

DE 102013208521 A1 * 11/2014 ............. G01S 19/39

OTHER PUBLICATIONS

Ljaz Akhter, Nonrigid Structure from Motion in Trajectory Space, 2008, Advances in Neural Information Processing Systems 21 (NIPS 2008) (Year: 2008).*

(Continued)

*Primary Examiner* — Matthias S Weisfeld
(74) *Attorney, Agent, or Firm* — Knobbe, Martens, Olson & Bear, LLP

(57) ABSTRACT

A trajectory planning system can be used to select a trajectory for an autonomous vehicle. The trajectory planning system may generate multiple trajectories and extract features from the generated trajectories. The trajectory planning system may evaluate the trajectories based on the extracted features and select a trajectory for the vehicle based on the evaluation. The selected trajectory may be used to control the vehicle.

17 Claims, 15 Drawing Sheets

(56) References Cited

U.S. PATENT DOCUMENTS

| | | |
|---|---|---|
| 2021/0114617 A1 | 4/2021 | Phillips et al. |
| 2021/0192748 A1 | 6/2021 | Morales Morales et al. |
| 2022/0055651 A1* | 2/2022 | Baric .................. G06N 5/01 |
| 2022/0135029 A1 | 5/2022 | Poubel Orenstein |
| 2022/0155096 A1* | 5/2022 | Kim ................. G01C 21/3811 |
| 2023/0107460 A1* | 4/2023 | Carvahlo .............. G06N 3/092 |
| | | 706/23 |
| 2023/0145535 A1* | 5/2023 | Hatamizadeh .......... G06N 3/02 |
| | | 514/460 |

OTHER PUBLICATIONS

Sina Dabiri, A deep convolutional neural network based approach for vehicle classification using large-scale GPS trajectory data, May 23, 2020, Elsevier, Transportation Research Part C (Year: 2020).*

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action issued for Application No. GB 2414747.2, dated Mar. 4, 2025.

Korean Office Action issued for Application No. KR 10-2023-0081102, dated Feb. 18, 2025.

Great Britain Office Action issued for Application No. GB 2308623.4, dated Dec. 18, 2023.

Great Britain Office Action issued for Application No. GB 2414747.2, mailed Oct. 17, 2025.

Korean Notice of Allowance received for KR Application No. 10-2023-0081102, mailed Nov. 24, 2025.

* cited by examiner

TRAJECTORY PLANNING BASED ON EXTRACTED TRAJECTORY FEATURES

BACKGROUND

Self-driving vehicles typically use multiple types of images to perceive the area around them. Training these systems to accurately perceive an area can be difficult and complicated.

DETAILED DESCRIPTION

Figure 1:
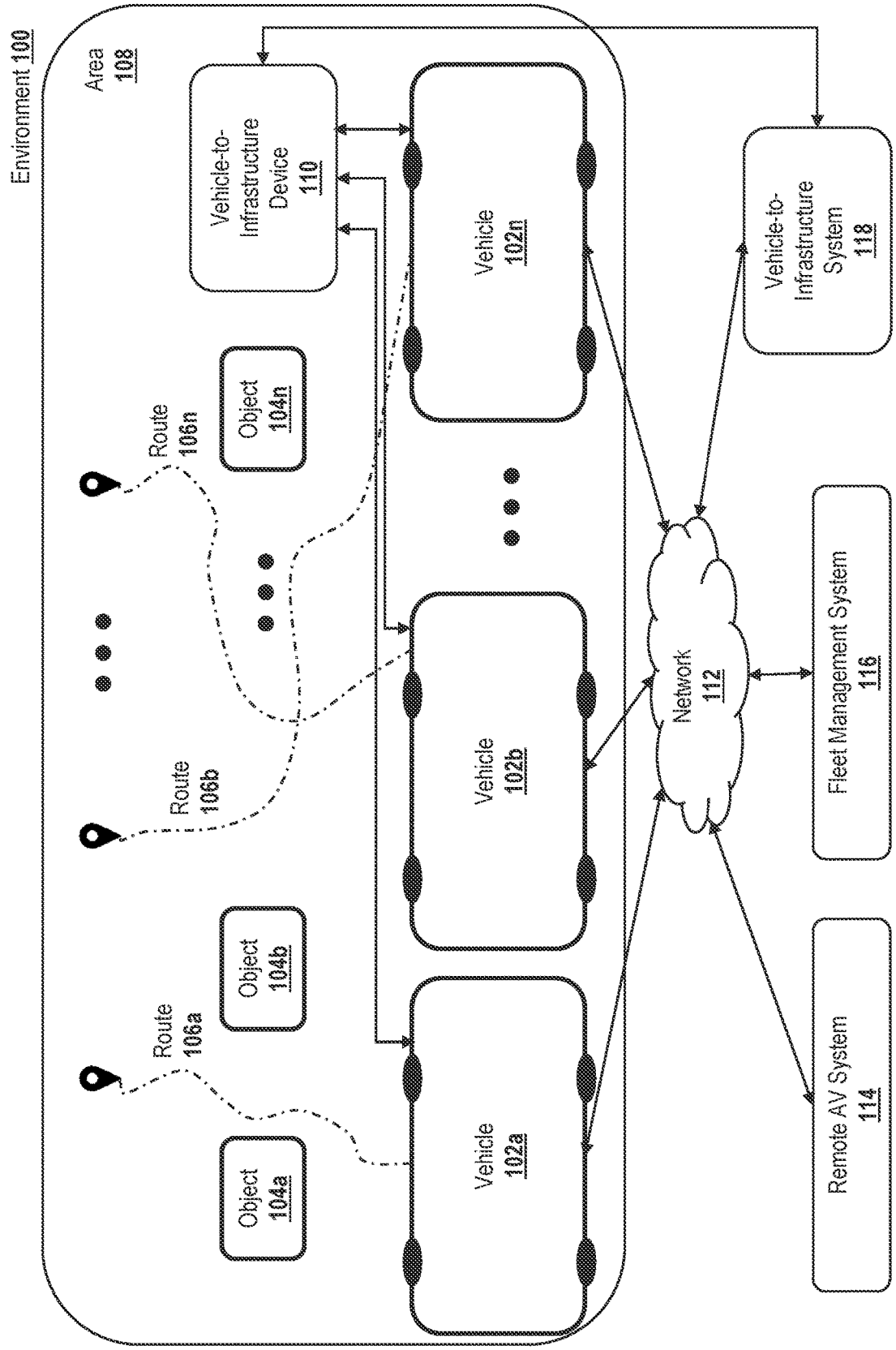
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. Also, the term "or" is used in its inclusive sense (and not in its exclusive sense) so that when used, for example, to connect a list of elements, the term "or" means one, some, or all of the elements in the list. Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

By evaluating the trajectories in a trajectory space, the machine learning model can simplify the analysis of trajectories. In addition, by scoring trajectory features of a trajectory, the machine learning model can provide insight into how the different trajectory features may influence the scoring (or ranking) of a trajectory relative to other trajectories. Moreover, by calculating a loss using a primary trajectory, which may differ from an expert trajectory (and be generated along with the set of trajectories), the training environment may more effectively train the machine learning model thereby improving the quality of the training the machine learning model.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Overview

Generating and selecting trajectories for an autonomous vehicle can be complicated. Moreover, it can be difficult to obtain insight as to why an autonomous vehicle selects a particular trajectory over another. In addition, learning a reward function for trajectories in a state-action space (e.g., by reviewing individual steps or decisions along a trajectory) can generate significant amounts of data that may limit an autonomous vehicle's ability to evaluate and select a trajectory in a reasonable amount of time given the vehicle's compute resource constraints.

To address these issues, a training environment may be used to train a machine learning model to learn an interpretable reward function in a trajectory space (e.g., by reviewing a trajectory in the aggregate). To train the machine learning model, the training environment may repeatedly provide the machine learning model with sets of features extracted from a set of trajectories (the features may also be referred to herein as trajectory features). For example, the training environment may provide the machine learning model with a set of trajectory features for each trajectory that is to be evaluated. The machine learning model may use the different sets of trajectory features to evaluate the respective trajectories. For example, the machine learning model may score individual trajectory features from the different trajectories and rank (or score) the trajectories based on the scores of the respective sets of trajectory features.

General Overview

In some aspects and/or embodiments, systems, methods, and computer program products described herein include and/or implement a testing system that performs trains a perception system end-to-end to identify objects. As a non-limiting example, the testing system can train the perception system by fusing a lidar image with a semantic image (generated by an image semantic network from a camera image), extracting features from the fused image, and modifying at least one network parameter in the image semantic network based on a calculated loss between a ground truth image and the features extracted from the fused image.

By virtue of the implementation of systems, methods, and computer program products described herein, an autonomous vehicle can more accurately identify objects within an image, more accurately identify the location of identified objects within the image, more accurately predict trajectories of identified objects within the image, determine additional features for identified objects, and infer additional information about the scene of an image.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
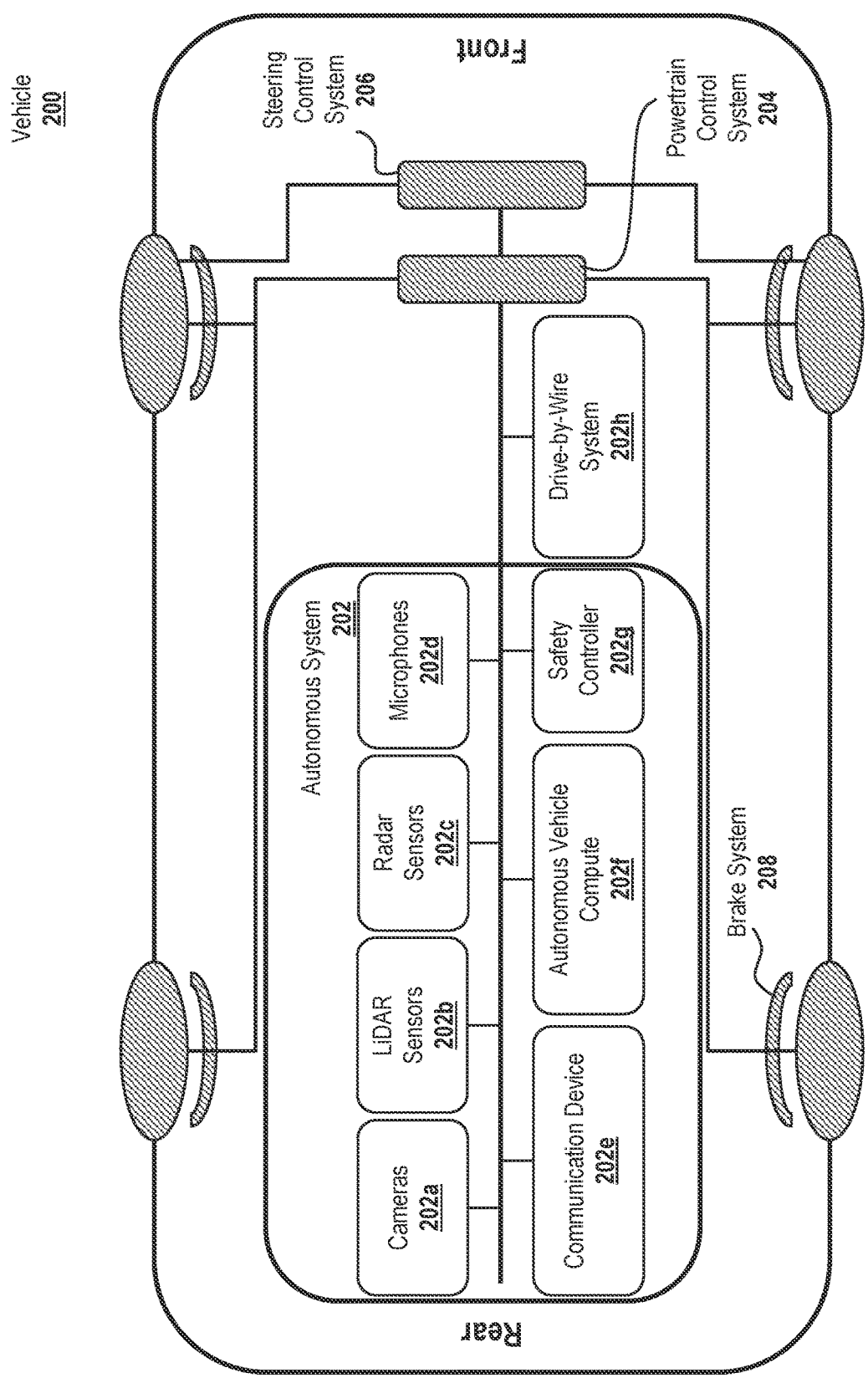
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
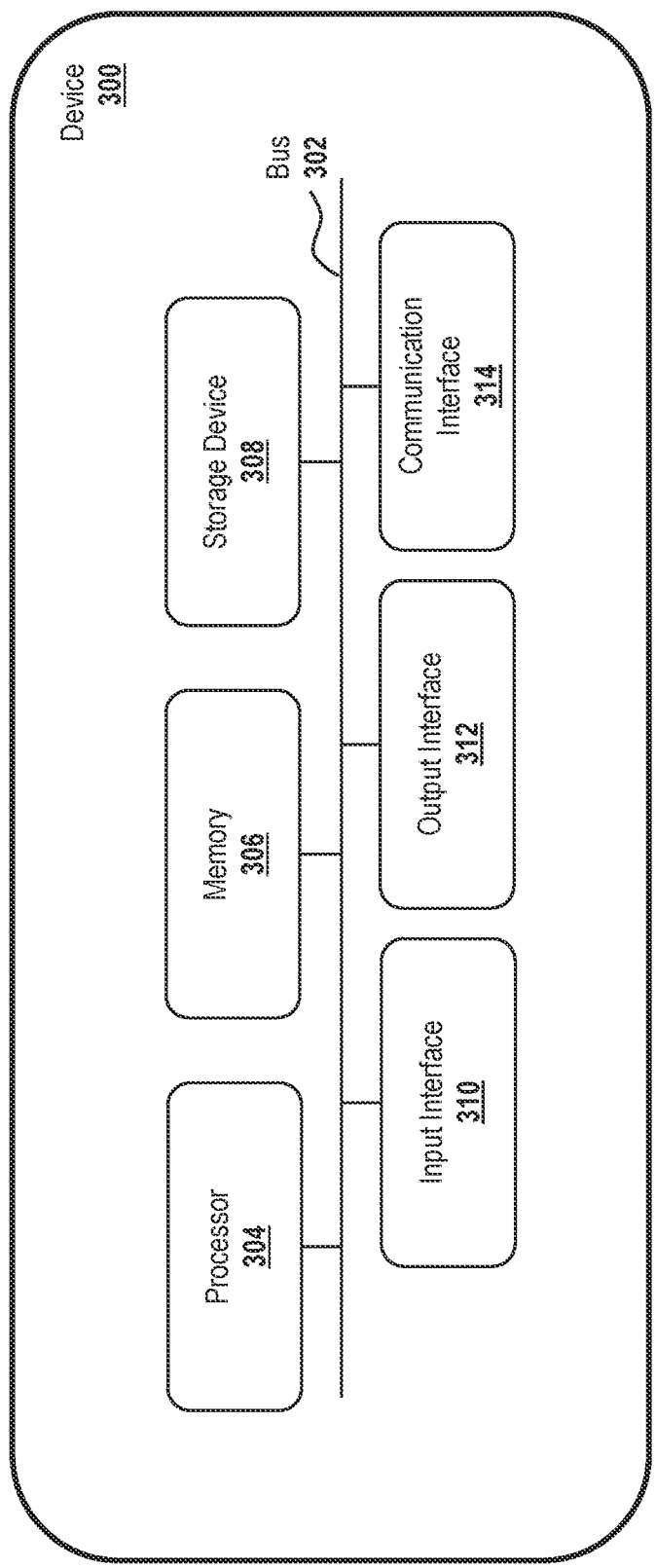
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 306 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
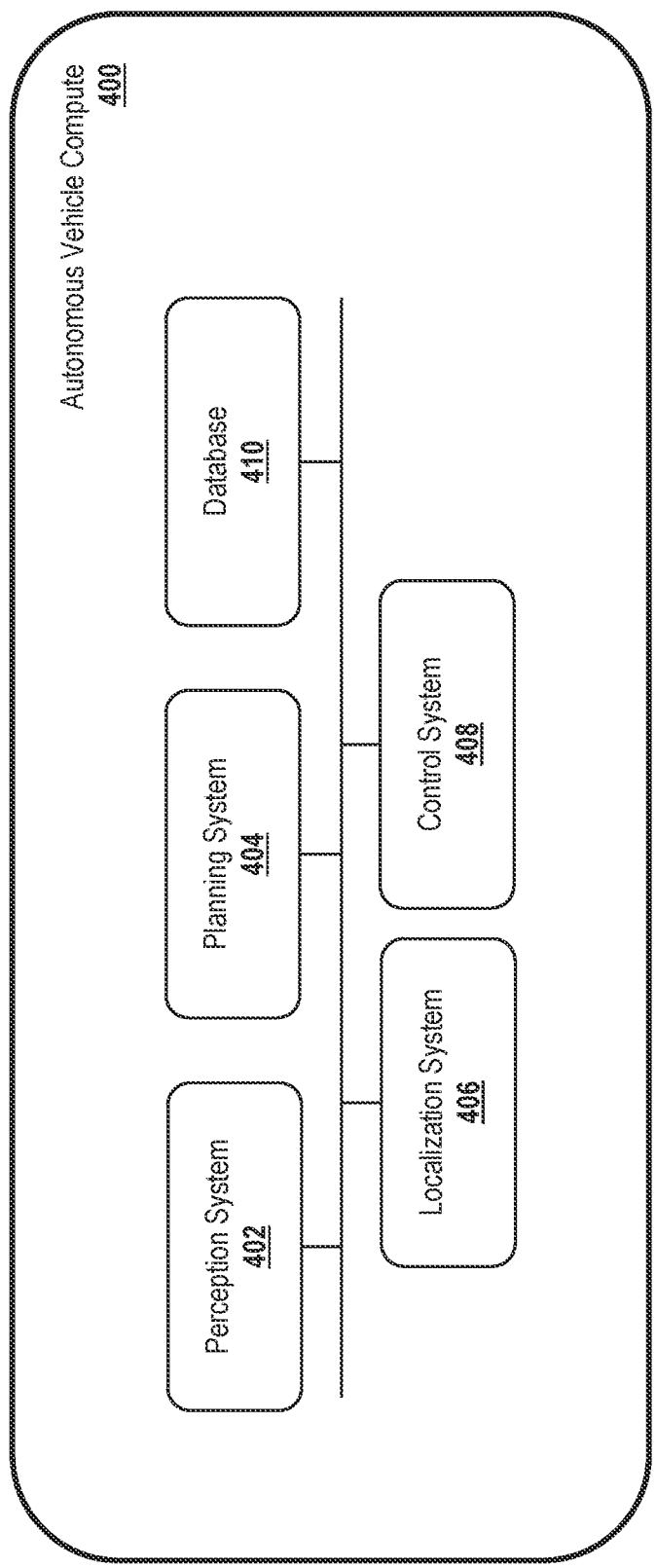
FIG. 4A is a diagram of certain components of an autonomous system.
Figure 4B:
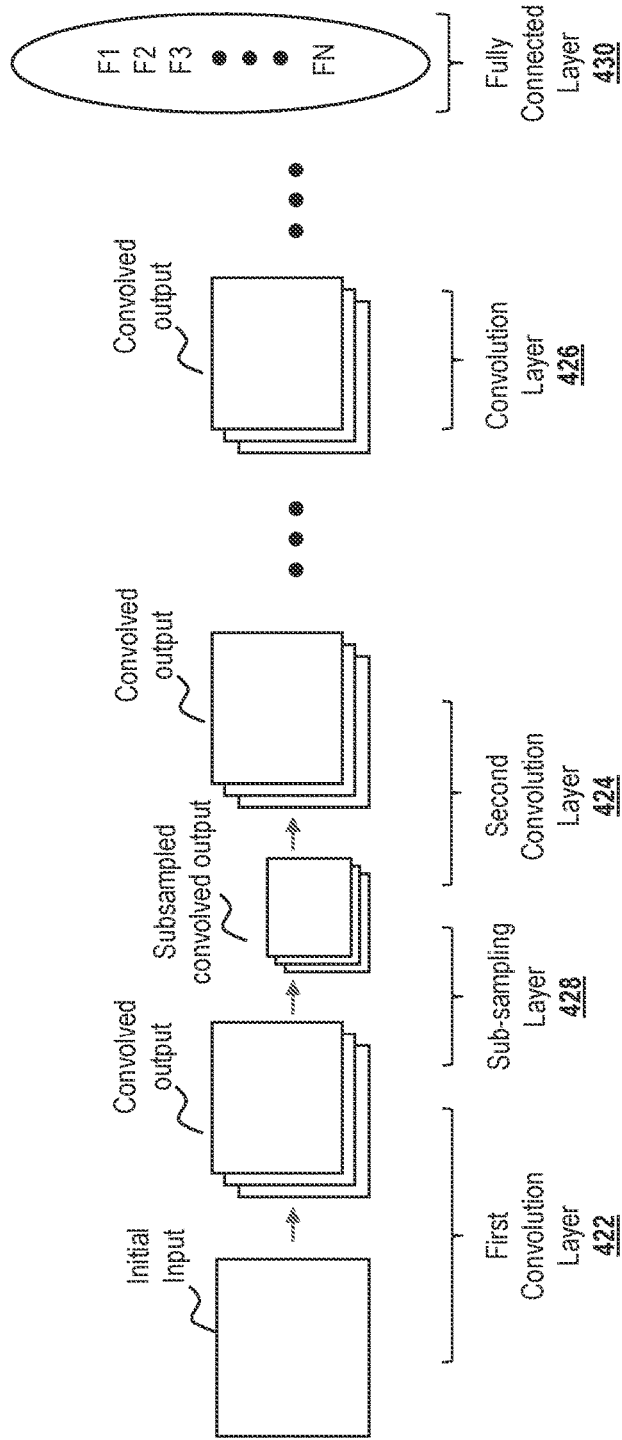
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
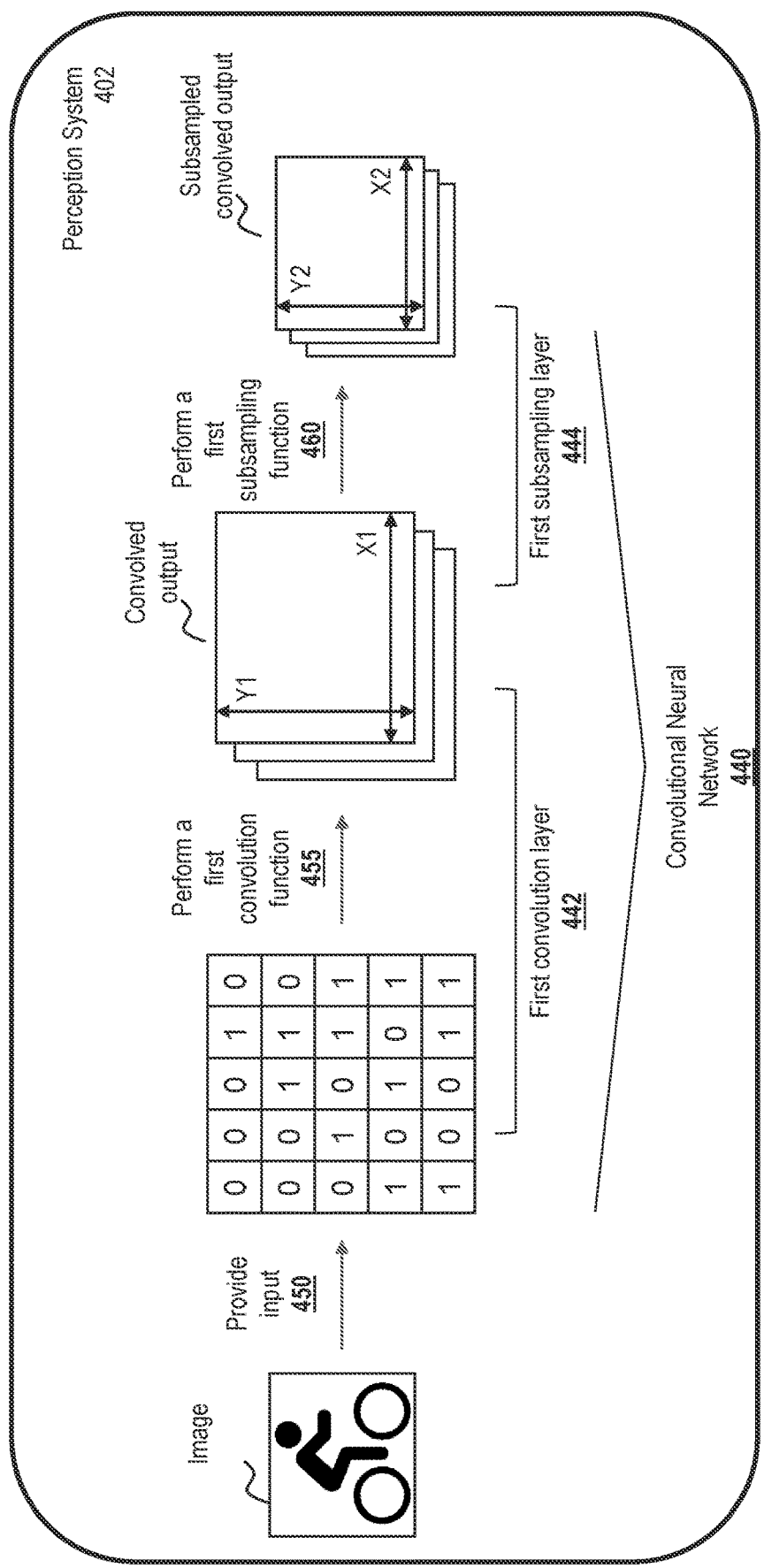
FIG. 4C and 4D are a diagram illustrating example operation of a CNN.
Figure 4D:
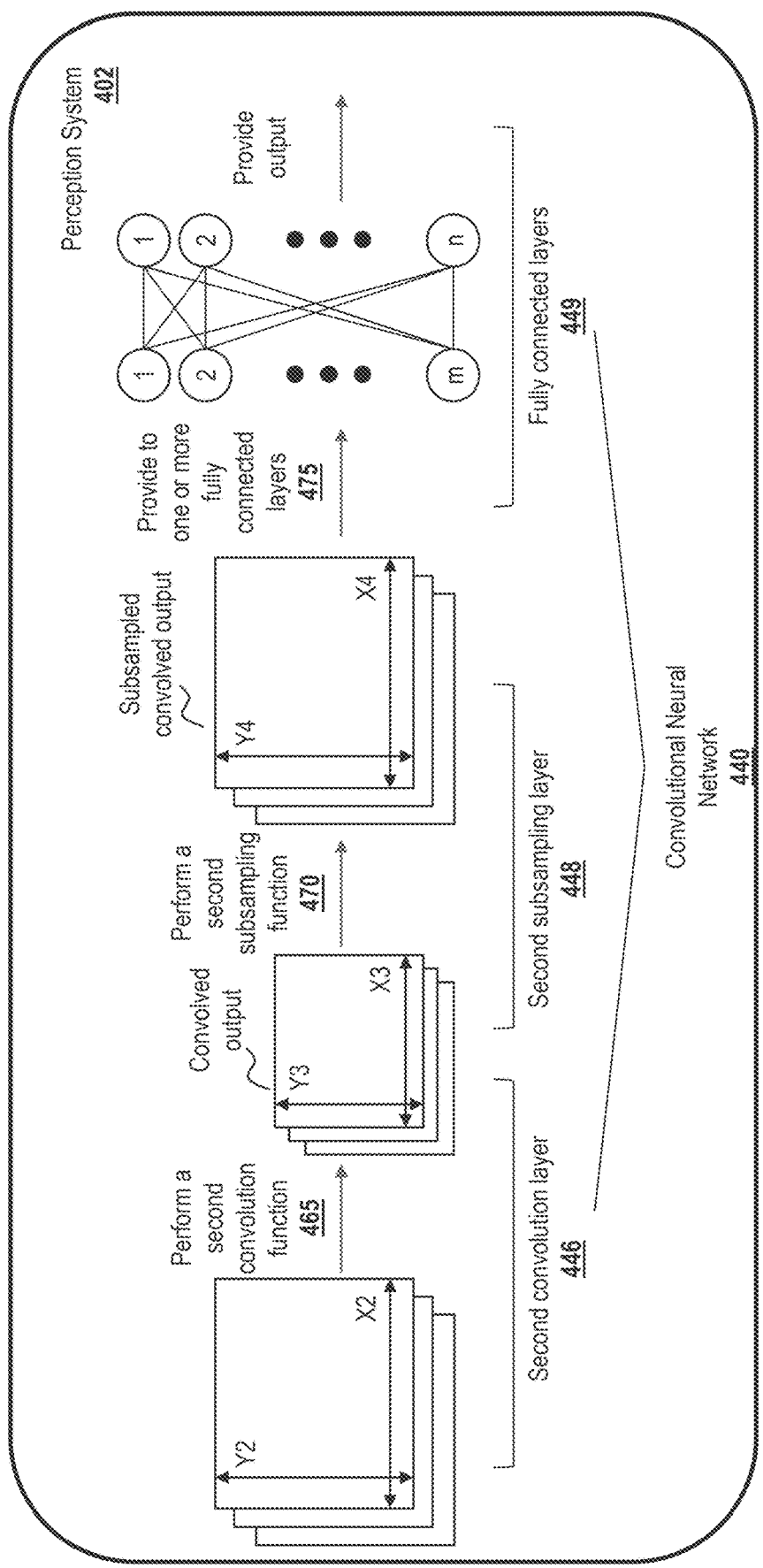

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Training a Machine Learning Model

Training a planning system of an autonomous vehicle to select an appropriate trajectory for a vehicle through a scene can be complicated. Moreover, it can be difficult to obtain insight as to why an autonomous vehicle selects a particular trajectory over another. In addition, learning a reward function for trajectories in a state-action space (e.g., by reviewing individual steps or decisions along a trajectory) can generate significant amounts of data that may limit an autonomous vehicle's ability to evaluate and select a trajectory in a reasonable amount of time given the vehicle's compute resource constraints.

To address these issues, a training environment may be used to train a machine learning model to learn an interpretable reward function in a trajectory space (e.g., by reviewing a trajectory in the aggregate). To train the machine learning model, the training environment may repeatedly provide the machine learning model with sets of features extracted from a set of trajectories (the features may also be referred to herein as trajectory features). For example, the training environment may provide the machine learning model with a set of trajectory features for each trajectory that is to be evaluated. The machine learning model may use the different sets of trajectory features to evaluate the respective trajectories. For example, the machine learning model may score individual trajectory features from the different trajectories and rank (or score) the trajectories based on the scores of the respective sets of trajectory features.

During training, the training environment may evaluate the machine learning model based on how the machine learning model ranks (or scores) the trajectories in the set of trajectories and the respective trajectory features. In some cases, the training environment can calculate a loss based on a comparison of a primary trajectory with other trajectories in the set of trajectories. The primary trajectory may be selected from the set of trajectories, and in some cases, may correspond to a trajectory from the set of trajectories that is similar to a previously recorded or expert trajectory.

Based on the calculated loss, the training environment may modify one or more parameters of the machine learning model such that the machine learning model favors the primary trajectory (or trajectories that are similar to the primary trajectory or the expert trajectory). For example, over time, the machine learning model can learn to rank (or score) a primary trajectory higher than other trajectories that are evaluated. In some cases, the training environment can train the machine learning model to rank or score the primary trajectory higher by reducing the loss as the rank (or score) of the primary trajectory increases.

By evaluating the trajectories in a trajectory space, the machine learning model can reduce computational resources used to evaluate trajectories. For example, instead of evaluating each incremental step or decision used to build trajectories, which can consume significant resources, the machine learning model can evaluate generated trajectories as a whole (e.g., in the trajectory space).

In addition, by scoring trajectory features of a trajectory, the machine learning model can provide insight into how the different trajectory features may influence the scoring (or ranking) of a trajectory relative to other trajectories. Moreover, by calculating a loss using a primary trajectory, which may differ from an expert trajectory (and be generated along with the set of trajectories), the training environment may more quickly or more effectively train the machine learning model thereby reducing the amount compute resources used to train the machine learning model and/or improving the quality of the training the machine learning model.

Figure 5A:
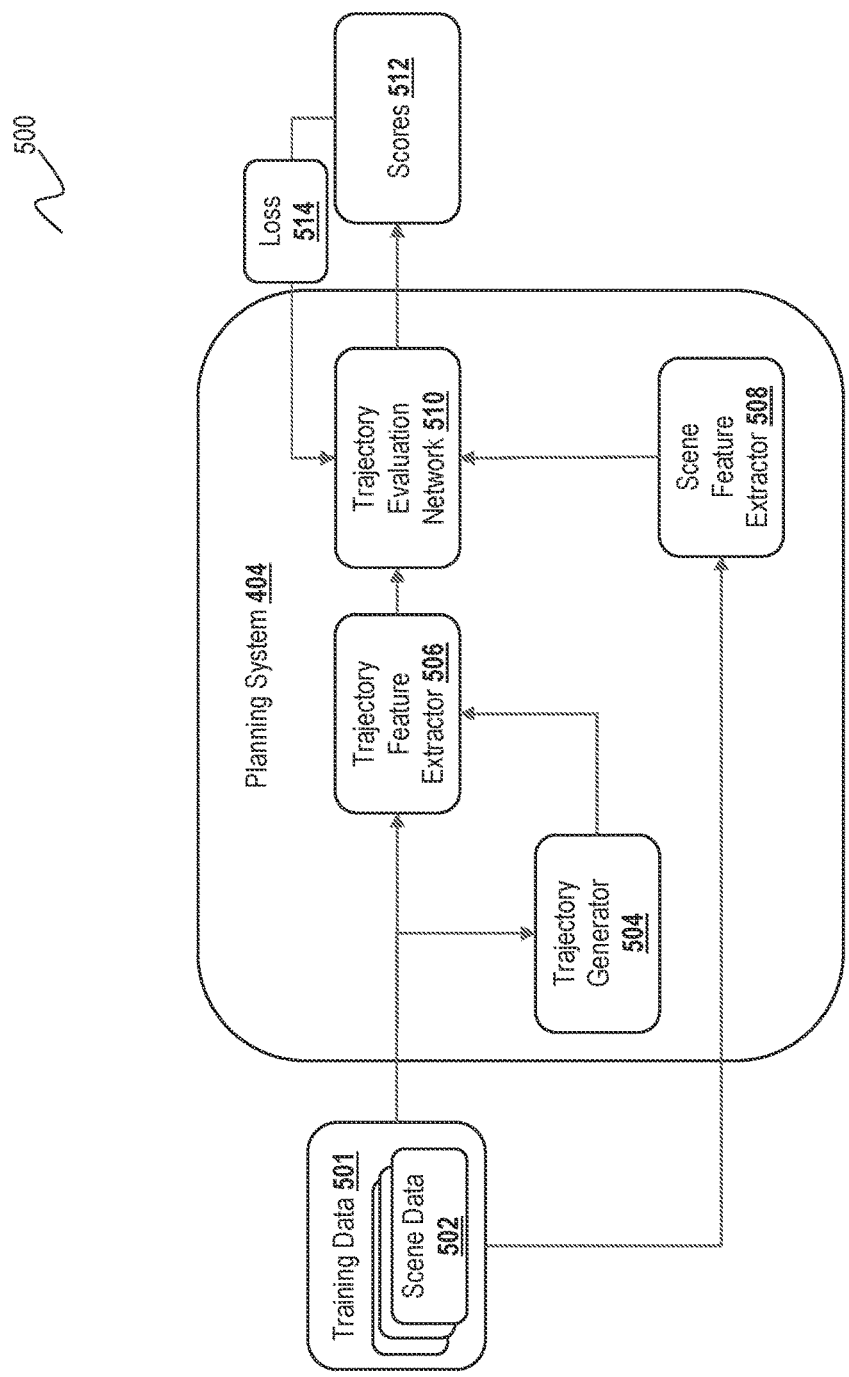
FIG. 5A is a block diagram illustrating a training environment for a planning system.

FIG. 5A is a block diagram illustrating a training environment 500 for a planning system 404. In the illustrated training environment 500, the planning system 404 uses training data 501 to generate scores 512. One or more computing devices (not shown) of the training environment 500 calculate a loss 514 using the scores 512. The computing devices of the training environment 500 may modify one or more parameters of one or more components, such as a machine learning model, of the planning system 404 to reduce the loss as additional training data 501 is evaluated. In this way, the training environment 500 can train the one or more components of the planning system 404.

The training data 501 can include sets of scene data 502 corresponding to hundreds, thousands, millions or more scenes. In some cases, each set of scene data 502 can correspond to a different scene and may be gathered over time as vehicles traverse various environments. The training data 504 may be stored in one or more data stores (not shown) in the training environment 500 and used to train one or more components of the planning system 404, such as but not limited to the trajectory evaluation network 510 or a machine learning model.

The scene data 502 for a particular scene (also referred to herein as a set of scene data 502) may include data from one or more sensors in a sensor suite, data received from the perception system 402 and/or localization system 406, etc. Thus, the scene data 502 may include localization data associated with a geographic location of a vehicle 200 when the scene data 502 is collected, map data associated with a map (e.g., a semantic or annotated map) of the location of the vehicle 200 that includes annotations regarding a position of static objects or areas in the location (e.g., objects or areas that are not expected to move or change, such as drivable area, non-drivable area, traffic signs, crosswalks, sidewalks, etc.), object data associated with identified objects in the location (e.g., position, orientation, velocity, acceleration, etc. of agents), route data associated with a determined route for the vehicle 200 from a start point to a destination, etc.

In some cases, the scene data 502 includes data related to objects within the scene of the vehicle 200 at a particular time (also referred to herein as a vehicle scene), such as objects around the vehicle 200 (non-limiting example: objects, such as but not limited to pedestrian, vehicles, bicycles, etc., identified by the perception system 402), drivable area, non-drivable area, background, etc. Thus, as a vehicle scene changes (e.g., due to the vehicle 200 moving or objects around the vehicle 200 moving), the scene data 502 can change in a corresponding fashion.

As described herein, the objects in a vehicle scene and represented in the scene data 502 may include, but are not limited to pedestrians, bicycles, other vehicles, signs, curbs, buildings, etc. Moreover, the scene data 502 can include state information associated with the objects in the scene, such as but not limited to position, orientation/heading, velocity, acceleration (relative to vehicle 200 or in absolute/geographic coordinates), predicted trajectory, etc. In some cases, the planning system 404 receives the scene data 502 from another system. In certain cases, the planning system 404 generates some of the scene data 502. For example, the planning system 404 may generate a predicted trajectory of an object based on sensor data or a semantic segmentation image (also referred to herein as a semantic image, segmented image) received from the perception system 402.

In certain cases, the scene data 502 for a particular scene can include sensor data associated with one or more sensors that capture data related to the environment (e.g., cameras 202a, lidar sensors 202b, radar sensors 202c, microphones 202d, etc.).

In some cases, the scene data 502 for a particular scene can include a semantic image (e.g., generated by the perception system 402). The semantic image may include rows and columns of pixels. Some or all pixels in the semantic image can include semantic data, such as one or more feature embeddings. In certain cases, the feature embeddings can relate to one or more object attributes, such as but not limited to an object classification or class label identifying an object's classification (sometimes referred to as an object's class) (non-limiting examples: vehicle, pedestrian, bicycle, barrier, traffic cone, drivable surface, or a background, etc.). The object classification may also be referred to as pixel class probabilities or semantic segmentation scores. In some cases, the object classification for the pixels of an image can serve as compact summarized features of the image. For example, the object classifications may include a probability value that indicates the probability that the identified object classification for a pixel is correctly predicted.

In some cases, the feature embeddings can include one or more n-dimensional feature vectors. In some such cases, an individual feature vector may not correspond to an object attribute, but a combination of multiple n-dimensional feature vectors can contain information about an object's attributes, such as, but not limited to, its classification, width, length, height, etc. In certain cases, the feature embeddings can include one or more floating point numbers, which can assist a downstream model in its task of detection/segmentation/prediction.

In certain cases, the feature embeddings can include state information regarding the objects in the scene, such as but not limited to an object's position, orientation/heading, velocity, acceleration, or other information relative to the vehicle 200 or in absolute/geographic coordinates. In certain cases, the planning system 404 can generate additional feature embeddings, such as state information regarding the objects, from the scene data 502.

In the illustrated example, the planning system 404 includes a trajectory generator 504, a trajectory feature extractor 506, a scene feature extractor 508, and a trajectory evaluation network 510, however, it will be understood that the planning system 404 can include fewer or more components. In some embodiments, any and/or all of the components of the planning system 404 can be implemented using one or more processors or computer hardware (e.g., by microprocessors, microcontrollers, application-specific integrated circuits [ASICs], Field Programmable Gate Arrays (FPGAs), and/or the like). Such processors or computer hardware can be configured to execute computer-executable instructions stored on non-transitory storage media to perform one or more functions described herein. In certain cases, one or more of the components of the planning system, such as but not limited to the trajectory generator 504, trajectory feature extractor 506, and/or scene feature extractor 508 may be implemented using one or more machine learning models or neural networks.

The trajectory generator 504 can generate trajectories using the scene data 502 for a particular scene and may be implemented using one or more processors or other computer hardware, one or more machine learning models, neural networks, etc. In some cases, the trajectory generator 504 can generate hundreds or thousands or more trajectories for a particular scene based on the scene data 502 for the particular scene.

The trajectory generator 504 may generate trajectories using a variety of techniques. The trajectory generator 504 may generate the trajectories based on the kinematics of the vehicle 200, the objects identified in the vehicle scene (e.g., objects identified in the scene data 502), and/or a map of the vehicle scene (e.g., road network map and/or annotated map). In some cases, the trajectory generator 504 may use a greedy set cover algorithm to generate trajectories.

In certain cases, the trajectory generator 504 may use a trajectory generation policy to generate potential trajectories based on the scene data 502 The trajectory generation policy can be stored in one or more data stores associated with the planning system 404 or vehicle 200. The data stores may be located on the vehicle 200 or remote from the vehicle 200.

The trajectory generation policy can include one or more policies to indicate which vehicle actions to include in a trajectory (e.g., vehicle action policy), when to end a trajectory (e.g., end state policy), and/or when to end generating the trajectories (e.g., trajectory generation termination policy). Accordingly, the planning system 404 can use the trajectory generation policy to generate trajectories for evaluation by the trajectory evaluation network 510. Although reference herein may be made to one or more policies or sub-policies of the trajectory generation policy, it will be understood that the policies individually or in the aggregate can be referred to as the trajectory generation policy.

The vehicle action policy can indicate how to determine the actions that may be available for a trajectory. In certain cases, the vehicle action policy can indicate that all actions that are physically possible are to be considered available (e.g., regardless of the scene data 502). In certain cases, the vehicle action policy can indicate that the available actions are to be selected based on the scene data 502, safety thresholds, comfort thresholds, etc. (e.g., that not all physically possible actions are to be considered available for the vehicle).

In some cases, certain actions can be omitted from potential inclusion in a trajectory if they are not physically possible (e.g., the vehicle is not physically capable of increasing its acceleration and/or increasing its turning angle at that point in time) and/or would violate a safety threshold, comfort threshold, or other criteria. For example, if the trajectory generator 504 includes a safety threshold of not moving onto a sidewalk and the scene data 502 indicates that a sidewalk is immediately to the right of the vehicle 200, the vehicle action policy can indicate that turning right is not to be considered an available action and can omit it from inclusion in a trajectory. Similarly, the vehicle action policy can use other thresholds for the safety threshold to determine which actions are available for the simulations, such as, but not limited to, an acceleration or deceleration threshold, location of objects relative to the vehicle 200, edge of the road, combination of turn angle and speed (e.g., turn angle and speed that could result in the loss of control of the vehicle 200 or the vehicle 200 rolling), etc.

As another example, if the trajectory generator 504 implements a comfort threshold as a centrifugal force threshold, the vehicle action policy can indicate that actions that result in a centrifugal force that satisfies (or exceeds) the centrifugal force threshold are not to be considered for the simulations. Similarly, as described the vehicle action policy can use other thresholds for the comfort threshold, such as an acceleration or deceleration threshold, turning angle threshold, etc.

In certain cases, the vehicle action policy can indicate that the available actions are to be determined or obtained from a trained neural network. The trained neural network can use learned features from past driving data to determine actions that do not satisfy a safety and/or comfort threshold, or other criteria, and omit those actions from the available actions for inclusion in a trajectory. In this way, the trajectory generator 504 can avoid using time and compute resources to explore actions and/or states that are unlikely to result in a viable trajectory. This can increase the time and compute resources available to explore viable trajectories, thereby increasing number of viable trajectories generated and the confidence in the selected trajectory, as well as increasing the speed by which the system analyzes viable trajectories.

In some cases, an end state policy can be used to determine when a particular trajectory should end. The end state policy can take into account any one or any combination of threshold simulated time period, threshold simulated distance or landmark reached or passed to determine when a particular trajectory should end. For example, the end state policy can indicate that the trajectory generator 504 each trajectory should correspond to six seconds of travel time (or some other threshold time period). As another example, the end state policy can indicate that the trajectory generator 504 is to simulate a trajectory until a threshold distance has been simulated or a landmark reached. For example, the trajectory generator 504 simulates a trajectory until ¼ mile (or other threshold distance) has been simulated or until an intersection (or another landmark) has been passed. As such, a trajectory simulation may be terminated even though additional actions could be simulated (e.g., the simulations could continue). For example, the end of a trajectory may not represent the end of a route or the termination of driving, rather the end of a trajectory can represent a point (in time, location, distance, etc.) at which the simulated trajectory is to end.

The trajectory generator 504 can terminate generating trajectories according to a trajectory generation termination policy. The trajectory generation termination policy can indicate how long the trajectory generator 504 is to simulate trajectories. In some cases, the trajectory generation termination policy can indicate that the trajectory generator 504 is to simulate trajectories until a threshold time period, threshold number of trajectories are generated, or a threshold amount of processing is reached. For example, the trajectory generation termination policy can indicate that the trajectory generator 504 is to generate trajectories for 100 ms, 200 ms, 500 ms, 1 sec, or more. During this threshold time period, the trajectory generator 504 can generate and evaluate as many trajectories as possible, which may include 1,000 or more trajectories. In certain cases, the trajectory generation termination policy can indicate that the trajectory generator 504 is to generate a particular quantity of trajectories. For example, the trajectory generation termination policy can indicate that the trajectory generator 504 is to generate 1,000, 10,000, or 1,000,000 trajectories before terminating. In certain cases, the trajectory generation termination policy can indicate that the trajectory generator 504 is to use a particular amount or processing power to generate trajectory simulations. Any one or any combination of the aforementioned thresholds, or other thresholds, can be used by the trajectory generation termination policy to indicate how long the trajectory generator 504 is to generate trajectories for the trajectory evaluation network 510. Once the particular threshold is reached, the trajectory generator 504 can terminate generating trajectories.

In some cases, the trajectory generator 504, one or more computing devices of the training environment 500, and/or a user, may identify at least one of the generated trajectories as a primary trajectory and some or all of the remaining trajectories as secondary trajectories. The primary trajectory can be identified based on a comparison with a preset trajectory.

The preset trajectory can be a path taken by a vehicle at a previous time or a path identified by a user. For example, a previous vehicle 200 may have traveled the preset trajectory at a previous time and/or a person may have driven a vehicle along the preset trajectory. The path taken previously can be identified as a preferred or expert path for that particular scenario and identified as the preset trajectory. As another example, a user, upon reviewing the scene data 502 may determine a preferred or expert path or trajectory through the scene and identify the determined trajectory as the preset trajectory. In either case, the preset trajectory can be determined prior to the selection of the primary trajectory.

The preset trajectory can include a variety of parameters or features that can be used to compare it with other trajectories. In some cases, the parameters or features can be extracted from the preset trajectory and/or identified by a user. The features or parameters of the preset trajectory can include, but are not limited to, acceleration, velocity, heading, distance to destination, distance from a route, estimate of how close the ego vehicle is to a collision, continuity of the trajectory, etc.

To identify the primary trajectory from the other trajectories generated by the trajectory generator 504, the generated trajectories can be compared with the preset trajectory. In some cases, the trajectory generator 504 (or other computing device) can identify a generated trajectory that is similar to (or most similar to) the preset trajectory as the primary trajectory. In making this comparison, the trajectory generator 504 can compare any one or any combination of features of the preset trajectory with corresponding features of the generated trajectories. For example, the trajectory generator 504 can compare the acceleration, velocity, difference in distance (e.g., how close the trajectories align along a coordinate system), of the preset trajectory to the generated trajectories. In certain cases, the trajectory generator 504 can identify the generated trajectory that is most similar to the preset trajectory as the primary trajectory.

In some cases, the trajectory generator 504 may weight and/or prioritize the different parameters of the trajectories. For example, the trajectory generator 504 may first identify a subset of the generated trajectories that most closely align with the traveled path of the preset trajectory. Within the subset of generated trajectories, the trajectory generator 504 may identify one or more trajectories that most closely align with the acceleration and/or velocity of the preset trajectory. Of the remaining generated trajectories, the trajectory generator 504 may select and/or identify the primary trajectory. Accordingly, the primary trajectory can be identified as a generated trajectory that (closely or most closely) aligns with the preset trajectory or expert trajectory.

The trajectory feature extractor 506 can extract one or more features from the generated trajectories and can be implemented using one or more processors or other computer hardware, one or more neural networks, etc.

The extracted features can correspond to one or more parameters of the generated trajectories and can include without limitation any one or any combination of: collision (e.g., whether a collision is detected during the trajectory), collision with other tracks (e.g., times to collision with different tracks, such as the track in front, if current is followed), collision sum (e.g., sum of different determinations of a collision at different times), collision energy sum (e.g., aggregation of energy for one or more potential collisions), trajectory coupling (e.g., continuity when concatenating a past trajectory with the proposed trajectory), traffic light rules (e.g., whether the trajectory violates any traffic rules, such as a red light), route center line proximity (e.g., proximity to center line of vehicle route), on drivable area (e.g., amount of trajectory on a drivable area (e.g., road) or whether the trajectory leaves a drivable area), off road sum (e.g., sum of time off road), off road energy sum (e.g., aggregation of energy from being off road), is track ahead a pedestrian (e.g., whether or how many pedestrians intersect with the trajectory or whether the track in front is a pedestrian), is track ahead active (e.g., for tracks that are predicted to intersect with the trajectory, whether the corresponding object is active or moving or expected to move), heading changes sum (e.g., aggregation of heading changes), heading changes (e.g., whether, how many, or amount of heading changes), heading alignment (e.g., alignment of ego vehicle at different times or waypoints throughout the trajectory), final heading alignment (e.g., alignment of vehicle 200 at end of trajectory), ego vehicle speeds (e.g., speeds of the vehicle 200 at different times or waypoints of the trajectory), ego lateral acceleration road (e.g., lateral acceleration of vehicle 200 at different times or waypoints during the trajectory), maximum ego lateral acceleration road (e.g., maximum lateral acceleration of vehicle 200 during the trajectory), centrifugal force of vehicle 200 during the trajectory, ego displacements (e.g., position of the vehicle 200 during the trajectory), distance to turn stop (e.g., distance to a turn that includes a stop), distance to traffic light (e.g., distance to a traffic light), distance to track ahead (e.g., distance to a detected (or next) object in the vehicle scene), distance to stop sign (e.g., distance to a stop sign), distance to goal not increasing (e.g., whether the distance to the goal is not increasing for the vehicle at one or more points of the trajectory including the end of the trajectory), distance to goal decreasing (e.g., whether and/or the amount the distance to the goal is decreasing for the vehicle at one or more points of the trajectory including the end of the trajectory), distance to goal change (e.g., amount of change to the distance to the goal), distances to stop (e.g., distance to stop the vehicle 200), deceleration to stop at goal (e.g., amount of deceleration to stop at goal), ego speed limit (e.g., whether (and amount) the vehicle 200 is exceeding (or below) the speed limit for its location), ego jerk (e.g., rate of change of acceleration experienced by the vehicle 200 at different times or waypoints in the trajectory), ego max jerk (e.g., maximum rate of change of acceleration experienced by the vehicle 200 in the trajectory), etc. Similar features can be identified or extracted from the preset trajectory (e.g., as part of identifying the primary trajectory).

The trajectory feature extractor 506 may extract the aforementioned features in a variety of ways. In certain cases, the trajectory feature extractor 506 uses a combination of trajectory data associated with a trajectory and scene data 502 to extract features from the trajectory. For example, the scene data 502 may include route information for the vehicle 200 and the trajectory feature extractor 506 may compare the route information with a generated trajectory to determine the proximity of the trajectory to the center line of the route. In some cases, the trajectory feature extractor 506 can extract the features based on predefined rules or instructions. For example, the trajectory feature extractor 506 can extract the speed, vehicle location, distance to goal, distance to stop sign or traffic light, distance to center of route, etc., for the vehicle 200 at 100 ms intervals, along the trajectory. The extracted information at different times can be used to determine the features for the generated trajectory. In certain cases, the trajectory feature extractor 506 can extract the aforementioned features or other features using a trained neural network that has been trained to receive trajectory data associated with a trajectory of a vehicle and generate feature extractions from the trajectory.

The extracted features of a trajectory, or trajectory features can be grouped in a variety of ways. In some cases, the trajectory feature extractor 506 generates feature vectors for the different trajectory features. The vector for a particular trajectory feature can include one or more times steps, one or more values for the times steps, and a feature size. For example, a vector for a heading alignment feature may include hundreds or thousands of time steps with a value corresponding to the alignment of the vehicle 200 alignment at those respective times. In some cases, the trajectory feature extractor 506 can down sample time steps or other features to conserve space and/or reduce the amount of data to be evaluated by the trajectory evaluation network 510. In certain cases, the trajectory features of a trajectory can be concatenated or combined to form a trajectory vector that includes data corresponding to the different trajectory features of the trajectory.

The scene feature extractor 508 can extract one or more features about the vehicle scene (also referred to herein as scene features) using the scene data 502, and can be implemented using one or more processors or other computer hardware, one or more neural networks, etc.

As described herein, the scene data 502 can include semantic data associated with the vehicle scene. In some cases, the scene feature extractor 508 can use the semantic data to generate an image of the vehicle scene, such as but not limited to a bird's-eye view image or semantic image. The scene feature extractor 508 can use the generated image and/or the scene data 502 to extract the scene features. In some cases, such as when the scene data 502 includes a semantic image with object classification scores, the scene feature extractor 508 can generate a second semantic image that includes additional features embedded in the semantic image.

The extracted scene features can include information about the vehicle scene that is common across the different trajectories. As a non-limiting example, the extracted scene features can include without limitation any one or any combination of location of agents (e.g., objects that can move independent of the vehicle 200 such as bicycles, vehicle, pedestrians, etc.) relative to different traffic signal, traffic signs, lanes markers, or other objects, expected actions by the different objects, speed/acceleration of agents, kinematic states, etc.

In some cases, the scene feature extractor 508 can extract the scene features based on predefined rules or instructions. In certain cases, the scene feature extractor 508 can extract the aforementioned features or other features using a machine learning model or neural network that has been trained to receive scene data 502 (such as a semantic image) and generate scene feature from the scene data 502. Similar to the trajectory features, the scene features can be grouped as one or more vectors and/or concatenated together to form a scene vector.

The trajectory evaluation network 510 can evaluate (e.g., score and/or rank) the generated trajectories and can be implemented using one or more processors or other computer hardware, one or more neural networks, etc.

In some cases, the trajectory evaluation network 510 can evaluate the generated trajectories based on a vehicle planning policy. The trajectory evaluation policy can indicate the criteria by which the trajectories are to be evaluated. For example, the vehicle planning can indicate certain parameters or features to assess in evaluating and scoring the generated trajectories. In some cases, in the training environment 500, the trajectory evaluation network 510 learns the vehicle planning policy based on feedback that it receives.

In some cases, the trajectory evaluation policy can indicate that one or more trajectory features and/or one or more scene features are to be used to evaluate the trajectories. In some cases, such as when scene features are used, the scene features can be combined (e.g., concatenated) with the trajectory features of individual features.

The features can be predefined, dynamically determined, or learned, such as, by using a neural network. The features can relate to vehicle safety (e.g., likelihood of collision, leaving road, etc.), passenger comfort (acceleration/deceleration, centrifugal force, degree of turn, etc.), efficiency (distance from center of route, lane change, etc.), and can include any one or any combination of collision (or likelihood of), amount or rate of acceleration, amount or rate of deceleration, distance to goal, distance to traffic signal (e.g., stop sign, light, etc.), lateral acceleration/deceleration, alignment or heading, change in alignment or heading, velocity, change in velocity, off road (e.g., leaving road), lane change, distance from route, drivability, centrifugal force, etc. It will be understood that fewer, more, or additional features can be used to evaluate the trajectories.

In certain cases, the trajectory evaluation policy can indicate how the different features are to be used to evaluate the trajectories. In certain cases, the trajectory evaluation policy can indicate one or more thresholds for the different features. For example, the trajectory evaluation policy can score the trajectories higher if one or more features of the trajectories satisfy corresponding feature thresholds and lower if they do not.

The thresholds can vary for the different features. For example, for a feature related to colliding with an object, a determination that the trajectory would (or would likely, e.g., >50%) result in a collision with an object may cause the planning system 404 to classify the trajectory as unsuccessful (or give it a low or failing score). As another example, the threshold for veering left or right may be based on the velocity of the vehicle 200. For example, a relatively larger degree turn threshold may be used at lower velocities and relatively smaller degree turn threshold may be used at higher velocities given that the centrifugal forces at the lower velocity will be lower. Accordingly, in certain cases, the planning system 404 can compare an estimated centrifugal force along a trajectory with a threshold centrifugal force to evaluate the trajectories.

In certain cases, the trajectory evaluation policy can indicate how to combine the one or more features to evaluate the trajectories. For example, the trajectory evaluation policy can indicate different weights for the different features to indicate how the features are to be weighted with respect to each other and/or how to determine an overall score for the trajectories based on the weighted features.

In some cases, the trajectory evaluation policy can indicate that the trajectories are to be compared with a preset trajectory, primary trajectory, or a route. The preset trajectory may correspond to a trajectory identified as being a trusted trajectory (e.g., an expert trajectory). The route can correspond to a planned route of the vehicle 200 from its starting point to its end point. In some such cases, the planning system 404 can score a trajectory higher or lower depending on its similarity to the preset trajectory or route. The similarities can take into account proximity to the preset trajectory or route as well as other features, such as, but not limited to, velocity, acceleration, etc.

In certain cases, the trajectory evaluation policy can indicate that trajectories are to be evaluated based on safety and/or comfort thresholds. Accordingly, trajectories with a higher safety and/or comfort score can receive a higher score.

As described herein, the trajectory evaluation network 510 can evaluate the trajectories based on the individual features of the trajectories and/or a combination of features. In some cases, the planning system 404 can score the individual features and use a combination (e.g., average, sum, standard deviation, minimum, maximum, etc.) of the scores of the individual features to generate the score for the trajectory.

In certain cases, the trajectory evaluation network 510 evaluates the generated trajectories based on the trajectory features extracted from the trajectories and/or the scene features extracted by the scene feature extractor 508. In some cases, the trajectory evaluation network 510 evaluates individual trajectories by identifying the individual extracted features of the trajectory, normalizing and shaping the features, communicating the shaped features to one or more fully connected layers, scoring the individual features using one or more scoring heads (and the output of the fully connected layers), and combining the feature scores to form trajectory scores.

In a similar way, the trajectory evaluation network 510 can iteratively or concurrently evaluate some or all of the generated trajectories to generate scores 512 for the generated trajectories. For example, the trajectory evaluation network 510 can generate scores 512 for the primary trajectory and some or all of the secondary trajectories.

In some cases, the trajectory evaluation network 510 generates multiple scores 512 for some or all trajectories. For example, the trajectory evaluation network 510 may generate a trajectory score for a particular trajectory and features scores for some or all of the trajectory features of the trajectory (e.g., the features extracted from the trajectory by, for example, the trajectory feature extractor 506).

In certain cases, the trajectory score for a particular trajectory can be based on some or all of the feature scores of the features from the trajectory. For example, the trajectory evaluation network 510 may use some or all of the feature scores to generate the trajectory score. In some cases, the trajectory evaluation network 510 combines some or all of the feature scores to generate the trajectory score. For example, the trajectory evaluation network 510 may concatenate or compute an average of the feature scores to generate the trajectory score for the trajectory. In some cases, when combining features scores, the trajectory evaluation network 510 can weight the feature scores. For example, the trajectory evaluation network 510 may weight the feature score for a collision greater than the feature score for a distance to center of route, etc.

One or more computing devices in the training environment 500 can calculate a loss 514 for the trajectory evaluation network 510 based on the scores 512. In some cases, the loss 514 can be calculated based on scores 512 for a primary trajectory and secondary trajectories. In certain cases, the loss 514 can be calculated in a way that incentivizes the trajectory evaluation network 510 to score the primary trajectory higher than the secondary trajectories. As a non-limiting example, the loss 514 can be calculated with the score for the primary trajectory in the numerator and the sum of all of the trajectory scores in the denominator, with instructions that the loss 514 should approach one. As the loss 514 is sent back to the trajectory evaluation network 510 it can modify its coefficients or weights to increase the score for primary trajectories generated from additional scene data 502. The training process can be repeated thousands, hundreds of thousands, or millions of times using a variety of scenes (and corresponding scene data 502) such that the trajectory evaluation network 510 learns to score primary trajectories higher than secondary trajectories.

Figure 5B:
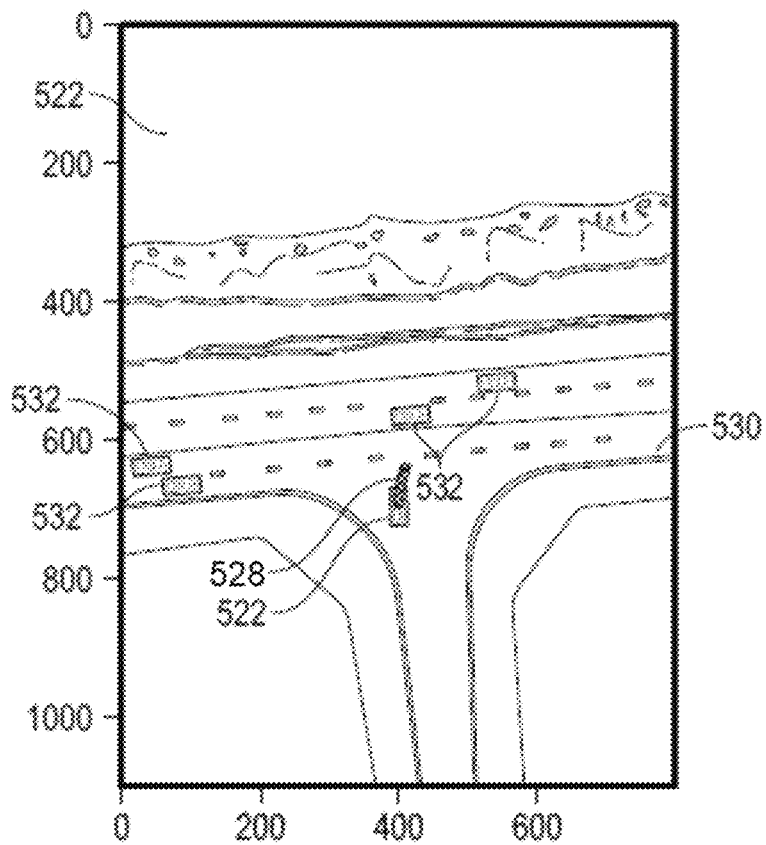
FIG. 5B is a diagram illustrating an image of an example of a generated trajectory within a vehicle scene.
Figure 5B:
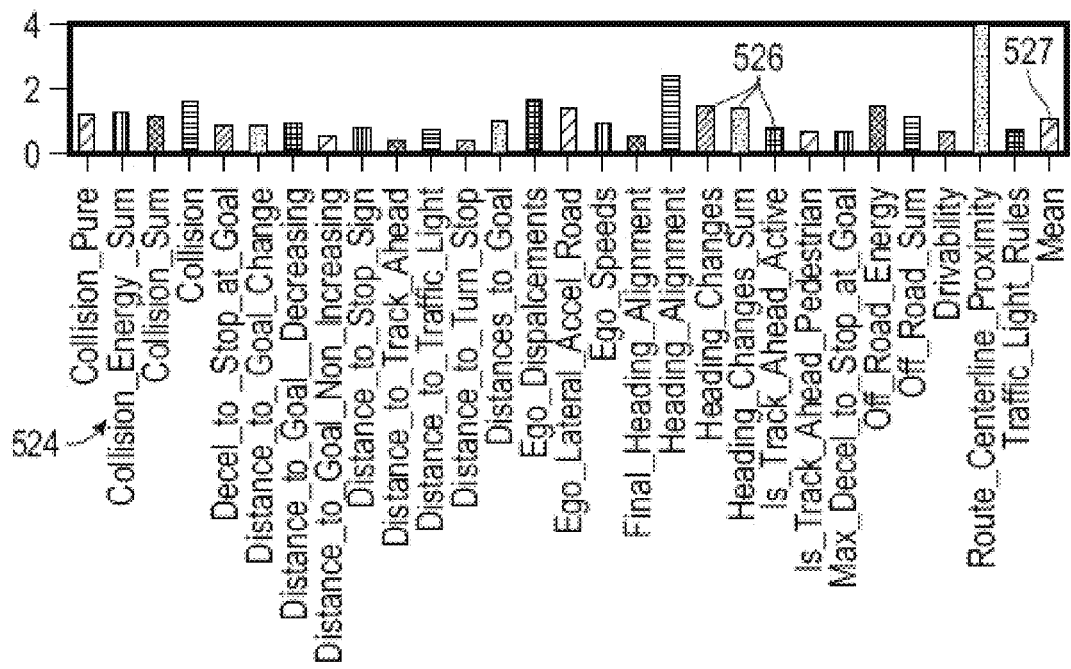

FIG. 5B is a diagram illustrating an image of an example of a generated trajectory 520 within a vehicle scene 522, as well as trajectory features 524 extracted from the trajectory 520, scores 526 for the extracted features 524, and a mean score 527. In the illustrated example, the vehicle scene 520 includes the ego vehicle 528 turning right onto a street 530 with various agents 532 moving in different directions.

In the illustrated example, the extracted trajectory features include collision pure, collision energy sum, collision sum, deceleration to stop at goal, distance to goal change, distance to goal decreasing, distance to goal not increasing, distance to stop sign, distance to track ahead, distance to traffic light, distances to stop, distance to turn stop, distance to goal, ego displacements, ego lateral acceleration road, ego vehicle speeds, final heading alignment, centrifugal force of vehicle 200 during the trajectory, heading alignment, heading changes, heading changes sum, is track ahead active, is track ahead a pedestrian, max deceleration to stop at goal, off road energy sum, off road sum, drivability, route center line proximity, and traffic light rules.

Similar features can be identified or extracted from the preset trajectory (e.g., as part of identifying the primary trajectory), however, it will be understood that fewer or more trajectory features can be extracted from the trajectory. Moreover, different trajectories can have different features extracted, different scores for different features, etc. As described herein, in some cases, the trajectory features can include preselected features. In certain cases, the trajectory features can include learned features, such as features learned by a machine learning model.

Each of the scores 526 can correspond to a respective trajectory feature 524. The mean score 527 can correspond to an average score for the scores 526. In some cases, the mean score 527 can correspond to a trajectory score for the generated trajectory 520.

Figure 6A:
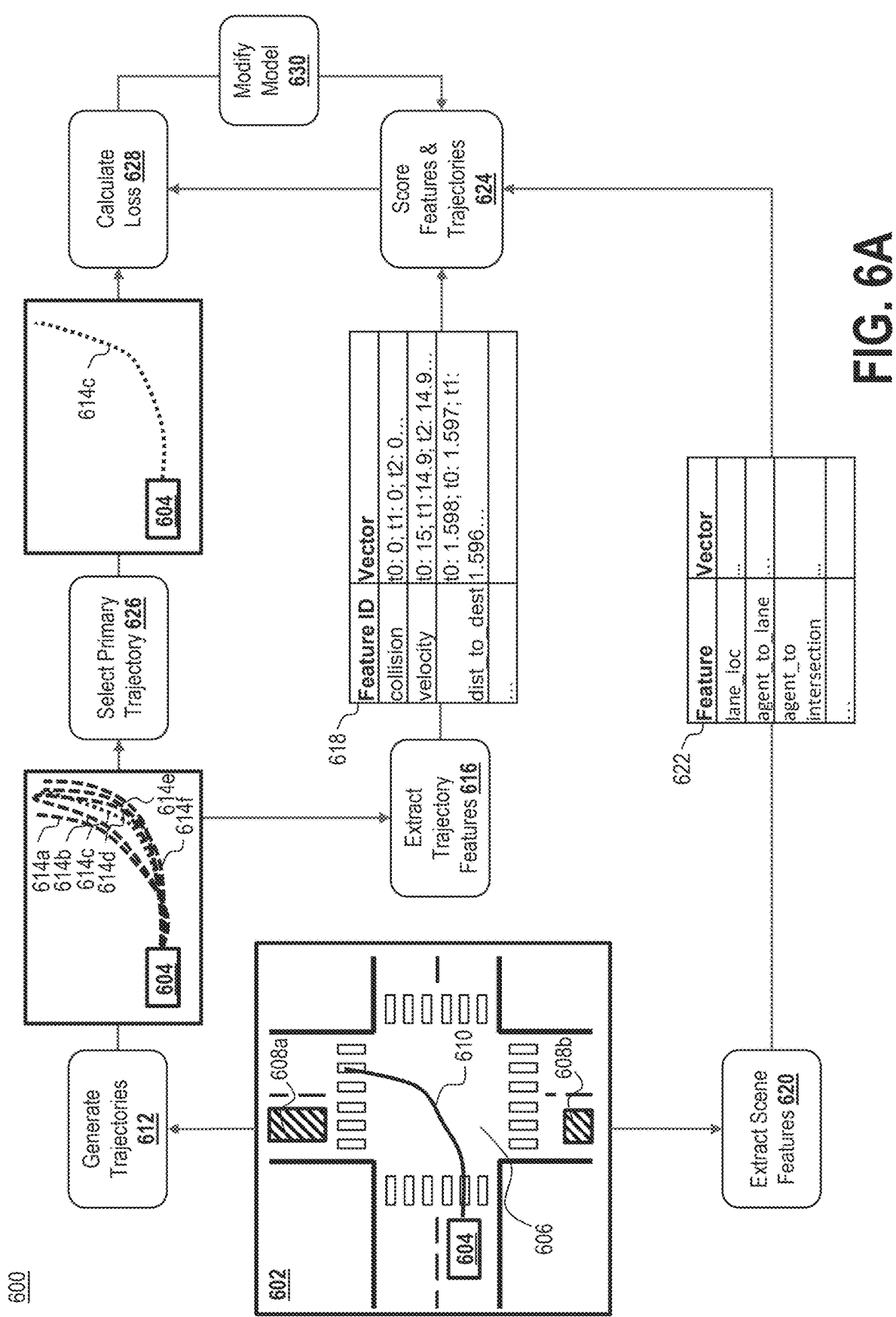
FIG. 6A is a data flow diagram illustrating an example of a training environment in which a planning system is being trained.

FIG. 6A is a data flow diagram illustrating an example of a training environment 600 in which a planning system 404 is being trained. In the illustrated example, the planning system 404 is being trained to score trajectories and trajectory features using scene data 502 corresponding to a vehicle scene 602. The training environment 600 can be similar to the training environment 500 and may include one or more of the components of the training environment 500.

In the illustrated example, the scene data 502 is illustrated as a birds-eye-view image of the vehicle scene 602. In some cases, the birds-eye-view image may include semantic data associated with a semantic image. As described herein the semantic image, may include one or more classifications, feature extractions, or vectors for objects in the vehicle scene 602.

In the illustrated example, the vehicle scene 602 includes an ego vehicle 604 making a left turn at an intersection 606. The vehicle scene 602 further includes two vehicle agents 608a, 608b (individually or collectively referred to as agents 608). The vehicle scene 602 further illustrates a preset trajectory 610 of the ego vehicle 604.

The preset trajectory 610 may form part of the scene data 502, the vehicle scene 602 or be separate. For purposes of simplicity in describing the illustrated example, the preset trajectory 610 is described as being part of the scene data 502. As described herein, the preset trajectory 610 may correspond to a recorded path taken by the ego vehicle 604 at a previous time and/or a path identified as being a preferred path through the vehicle scene 602. In some cases, the preset trajectory 610 may also be referred to as an expert path.

In some cases, the preset trajectory 610 may include one or more parameters of the ego vehicle 604 (also referred to herein as or state data of the ego vehicle 604) at various times as the ego vehicle 604 travels along the preset trajectory 610. For example, the preset trajectory 610 may include the position, velocity, acceleration, distance from a destination, distance from the intersection, distance from other agents, distance from a center of a route, or any one of the aforementioned features described herein with reference to FIG. 5B, etc. of the ego vehicle 604 as the ego vehicle 604 travels along the preset trajectory 610. In some cases, the preset trajectory 610 may include a vector for one or more parameters. The vector may include one or more time stamps and one or more values for the parameter at the respective time stamps. For example, the vector for the velocity of the ego vehicle 604 may include multiple time steps and a value for the velocity of the ego vehicle 604 at the respective time steps. It will be understood that the vectors for the different parameters may include fewer or more entries or data as desired.

At 612, the planning system 404 generates trajectories 614a-f (individually or collectively referred to herein as trajectories 614) for the ego vehicle 604. As described herein, fewer or more trajectories 614 may be generated. In some cases, hundreds, thousands or more trajectories 614 may be generated by the planning system 404, and each trajectory may include a travel distance, travel time, etc. In some cases, the planning system 404 generates trajectories by simulating one or more actions (e.g., change heading by veering left, change heading by veering right, accelerate, decelerate, maintaining velocity, etc.) of the vehicle 200 to perform in a particular sequence. As described herein, the trajectories 614 may be generated based on the scene data 502 and/or one or more policies, such as a trajectory generation policy.

At 616, the planning system 404 extracts trajectory features 618 (e.g., a first plurality of features) from some or all of the trajectories 614. The trajectory features may be similar to or different from the parameters or state data of the preset trajectory 610. In the illustrated example, the following trajectory features 618 of a particular trajectory are shown: collision, velocity, and distance to destination, however, it will be understood that fewer or more trajectory features 618 can be extracted from the trajectories 614, as described herein at least with reference to FIG. 5B. For example, the planning system 404 may extract tens, hundreds or more trajectory features 618 from each of the trajectories 614.

In the illustrated example, the trajectory features 618 include an identifier for the trajectory feature and a vector that includes feature data associated with the trajectory feature, however, it will be understood that the trajectory features 618 can be generated and/or stored in variety of ways. In the illustrated example, the vectors include time steps and values for the feature at the respective time stamp, however, it will be understood that the vectors can be in a variety of shapes and include a variety of information.

At 620, the planning system 404 extracts scene features 622 using the scene data 502 for the vehicle scene 602. The scene features 622 can be preidentified features and/or learned features, such as features learned by a machine learning model.

The scene features 622 can include features about the vehicle scene 602 such as location of lanes, sidewalks, location or kinematic state of agents, etc. The location can be a geographic location information or a location relative to any one or combination of the vehicle 604 and/or different agents 608. For example, the scene features 622 may include the relative location of agents to lane markings, an intersection, each other, or the ego vehicle 604, etc.

It will be understood that the scene features 622 may be different from the trajectory features 618. For example, the trajectory features 618 may correspond to individual trajectories 614. As such, trajectory features 618 and/or values for the trajectory features 618 for different trajectories 614 may be different. In contrast, the scene features 622 may correspond to the vehicle scene 602 and may therefore be the same relative to some or all of the trajectories 614 generated from the same scene data 502.

In some cases, the planning system 404 generates one or more images, such as one or more semantic images using the scene data 502 for the vehicle scene 602. The images may be in the form of a birds-eye-view or raster image, however, it will be understood that a variety of image types may be used.

In certain cases, the semantic images generated as part of extracting scene features 622 can be a second semantic image or an enriched semantic image compared to a semantic image that forms at least part of the scene data 502. The second or enriched semantic image can include additional features or extractions as compared to the first semantic image. For example, if the first semantic image includes classifications for various objects in the vehicle scene 602 the second or enriched semantic image can include classifications or extractions associated with potential paths or trajectories of objects within the vehicle scene, bounding boxes for the different objects, potential actions of the objects (e.g., not move, move, etc.), relative locations of objects (e.g., agent 608a is approaching the intersection 606 and is facing a red light or stop sign, etc.). The planning system 404 may extract the additional classification from the second or enriched segmentation image to obtain the scene features 622 (or second plurality of features).

At 624, the planning system 404 scores the trajectories 614 (and trajectory features 618). As described herein, the planning system 404 may score the trajectories 614 (and trajectory features 618) based on a trajectory evaluation policy (which it may be learning). In certain cases, the planning system 404 scores some or all of the trajectories 614, including the primary trajectory 614c (e.g., without having an indication that the primary trajectory 614c is the primary trajectory 614c). In some cases, the planning system 404 may score the trajectories 614 using any one or any combination of the trajectory features 618 (first plurality of features), the scene features 622 (e.g., second plurality of features), and/or a vehicle planning policy.

In some cases, the planning system 404 may score the trajectory features 618 of a trajectory and score the trajectory based on the scores for the trajectory features 618. For example, the planning system 404 may score the trajectory 614b using some or all of the trajectory features 618 of the trajectory 614b by, for example, determining an average, sum or other combination of the trajectory features 618 of the trajectory 614b.

In certain cases, the planning system 404 may score the trajectories 614 using the trajectory features 618 and the scene features 622. In some cases, the planning system 404 may combine the scene features 622 with the different trajectory features 618, score the trajectory features 618 using the combination of scene features 622 with the trajectory features 618 and score the corresponding trajectory using the scored trajectory features 618. For example, the planning system 404 may combine the scene features 622 with the trajectory features 618 of the trajectory 614b, score the trajectory features 618 using the combined scene features 622 and trajectory features 618 and score the trajectory 614b using the scored trajectory features 618.

At 626, a primary trajectory 614c is selected. One or more components of the planning system 404, such as a machine learning model, can be used to identify the primary trajectory 614c. In certain cases, a user identifies the primary trajectory 614c.

In some cases, the primary trajectory 614c is selected from the generated trajectories 614 based on the preset trajectory 610. For example, the trajectories 614 can be compared with the preset trajectory 610 and the primary trajectory 614c selected based on the comparison. In certain cases, the primary trajectory 614c can correspond to a trajectory that is similar to the preset trajectory 610. In some cases, the primary trajectory 614c can correspond to the trajectory that is identified as being the most similar to the preset trajectory 610. In certain cases, the planning system 404, or other processing device of the training environment 600, can using a machine learning model to compare the trajectories 614 with the preset trajectory 610 and identify the primary trajectory 614c.

To identify similarities between the trajectories 614 and preset trajectory 610, any one or any combination of features or parameters of the preset trajectory 610 can be compared with corresponding features of the trajectories 614. In some cases, features can be weighted such that a similarity between one set of features in the preset trajectory 610 and a trajectory will have a greater impact on whether the trajectory is determined to be similar to the preset trajectory 610 than a similarity between a different set of features in the preset trajectory 610 and a trajectory. For example, the similarity between an ending location and heading of a trajectory and the preset trajectory 610 can be weighted greater than the similarity between velocities at different points along the trajectory and preset trajectory 610. In some cases, the similarities or differences between individual features of the preset trajectory 610 and the trajectories 614 can be combined to determine the similarity or difference between the preset trajectory 610 and the trajectories 614. In some such cases, the similarities or differences between individual features can be summed, averaged, or otherwise combined, or a maximum or minimum can be calculated to determine the similarity or difference between the preset trajectory 610 and the trajectories 614.

In some cases, a trajectory is identified as the primary trajectory 614c if it satisfies a comparison threshold. In certain cases, the comparison threshold can include one or more thresholds for different features. In some cases, the thresholds for the different features can be based on the trajectory features 618 of the trajectories 614. For example, the trajectory features 618 of a first trajectory that is determined to have the most similarities with the preset trajectory 610 may be used at the thresholds for the different features. If a second trajectory is identified that has trajectory features 618 that are closer to the corresponding parameters of the preset trajectory 610, the planning system 404 can determine that the trajectory features 618 of the second trajectory satisfy the thresholds. In some such cases, the trajectory features 618 of the second trajectory can then be identified as the thresholds for the trajectory features 618.

. Although in the illustrated example, the primary trajectory 614c is selected from the trajectories 614, it will be understood that other trajectories can be used as the primary trajectory 614c. For example, in some cases, the preset trajectory 610 can be selected or used as the primary trajectory 614c.

At 628, a processing device of the training environment 600 calculates a loss for one or more components of the planning system 404, such as but not limited to the trajectory evaluation network 510 or a machine learning model that scores the trajectories 614. In some cases, the processing device calculates the loss using the primary trajectory 614c. In certain cases, the processing device compares one or more trajectories 614 with the primary trajectory 614c. In some cases, the processing device compares one or more of the highest scored trajectories 614 with the primary trajectory 614c. In certain cases, the processing device compares the highest scored trajectory of the trajectories 614 with the primary trajectory 614c.

In some cases, a lower loss may be determined as the primary trajectory 614c is ranked (or scored) higher and a higher loss may be determined as the primary trajectory 614c is ranked (or scored) lower. In some cases, the lowest possible loss can be determined when the highest ranked trajectory is the primary trajectory 614c. In certain cases, the loss can be determined with the score of the primary trajectory 614c as the numerator and the sum of some or all of the trajectories 614 the denominator. One example equation to calculate the loss is:

$$1 - \frac{\text{Score}_{primary\_trajectory}}{\Sigma \text{Score}_{all\_trajectories}}$$

Using the aforementioned loss equation, as the score the for the primary trajectory 614c increases and the score for the other trajectories 614 decrease, the loss will approach zero. It will be understood, however, that a variety of loss equations can be used to determine the loss.

At 630, a processing device of the training environment 600 modifies the component(s) of the planning system 404 (e.g., the trajectory evaluation network 510 or machine learning model) to which the loss corresponds. The relevant components may be modified based on (e.g., in response to) the calculated loss. In some cases, the processing device modifies one or more parameters of the trajectory evaluation network 510 (or machine learning model) based on the calculated loss. In certain cases, the processing device can modify one or more coefficients or weights of one or more nodes of the trajectory evaluation network 510 or machine learning model.

The process described herein with reference to FIG. 6A can be repeated hundreds, thousands, millions, or more of times using the training data 501, which can include scene data 502 corresponding to hundreds, thousands, millions, or more scenes. As the planning system 404 processes the scene data 502 corresponding to the different scenes, the trajectory evaluation network 510 or machine learning model may continue to be modified until trained to meet a training threshold (e.g., time, accuracy, etc.). Once trained, the components, such as the trajectory evaluation network 510 or its coefficients, weights, nodes, or other parameters, may be integrated into a vehicle 200.

As the parameters of the trajectory evaluation network 510 are modified, the scores for the trajectories may change such that the score for the primary trajectory 614c go up while scores for secondary trajectories go down. Moreover, scores for trajectories with features that are similar to the primary trajectory 614c may go up while scores for trajectories with features that are dissimilar to the primary trajectory 614c go down. In this way, the trajectory evaluation network 510 can indirectly learn the features for preferred trajectories such that when given new scene data 502, the trajectory evaluation network 510 is more likely to score trajectories like the primary trajectory 614c the highest and select those trajectories for use to control the vehicle.

In addition, the trajectory evaluation network 510 may indirectly learn how scores for individual trajectory features 618 affect the score for a corresponding trajectory, and adjust the scores for the trajectory features 618 and/or their coefficients or weights to favor trajectories that are similar to the primary trajectory 614c. Moreover, the trajectory evaluation network 510 may be able to output the scores for the trajectory features 618 enabling a user to understand how the trajectory evaluation network 510 scored the trajectory features 618 used to generate a trajectory score.

In some cases, when the primary trajectory 614c is a generated trajectory (as opposed to the preset trajectory 610), the trajectory evaluation network 510 can more efficiently modify its parameters to increase the score for the preset trajectory 610 than when the preset trajectory 610 is the primary trajectory 614c. This may result in a shorter time (and less computational resources) to train the trajectory evaluation network 510. It will be understood, however, that in some cases the preset trajectory 610 may be used as the primary trajectory 614c.

It will be understood that the various steps described herein with reference to FIG. 6 may be performed in a variety of orders and that one or more steps can be combined or omitted. In some cases, the trajectories (612) may be generated and/or the primary trajectory (626) selected prior to or concurrently with the extraction of trajectory features (616), extraction of scene features (620), and/or the scoring of features and trajectories (624). As another example, in certain cases, scene features may not be extracted (620) and/or may not be used to score the trajectory features and trajectories (624).

During operation in an autonomous vehicle, the planning system 404 may receive scene data 502 corresponding to real time data of a vehicle scene and generate scores for the trajectories 614 as described herein. The planning system 404 may select at least one of the trajectories 614 as the trajectory to use to control the vehicle 200. In some cases, the planning system 404 selects the trajectory of the trajectories 614 that has the highest score. As the planning system 404 has been trained to rank trajectories similar to primary trajectory 614c the highest, in use, the planning system 404 may select the trajectory of the trajectories 614 that is closest to what would have been a primary trajectory 614c.

Figure 6B:
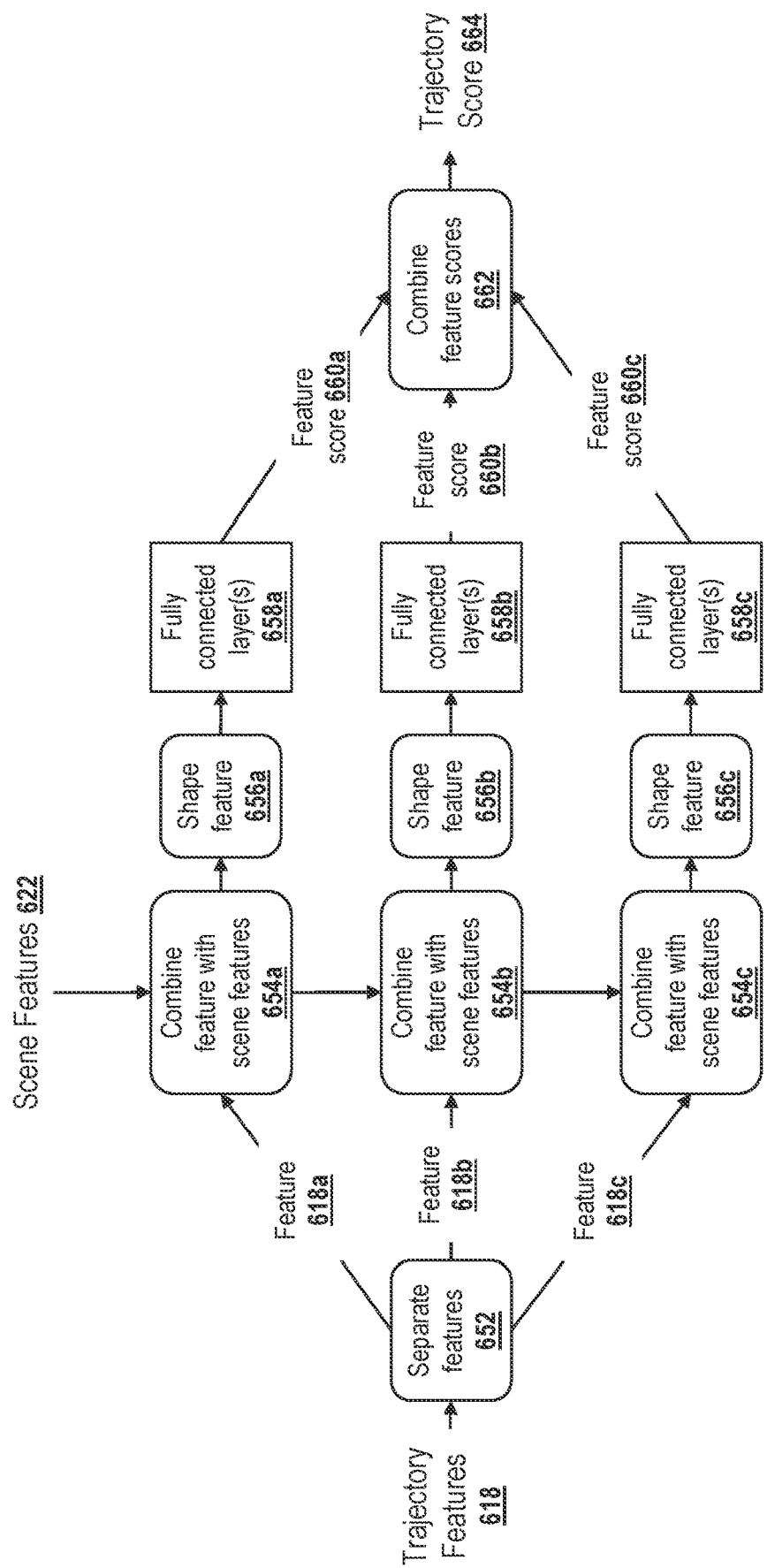
FIG. 6B is a data flow diagram illustrating an example of the operations and data structures used by the planning system to score the features and trajectories.

FIG. 6B is a data flow diagram illustrating an example of the operations and data structures used by the planning system 404 to score the features and trajectories, similar to step 624 described above with reference to FIG. 6A. In some cases, the planning system 404 scores the features and trajectories using a machine learning model or the trajectory evaluation network 510, however, it will be understood that any one or any combination of components described herein may be configured to score the features and trajectories.

At step 652, the planning system 404 separates the trajectory features 618 extracted from a trajectory of the generated trajectories 614. As described herein, in some cases, the trajectory features 618 may be expressed as vectors, such that in separating the trajectory features 618 of the trajectory, different vectors may be identified and separated. In the illustrated example, three trajectory features 618 are separated (trajectory feature 618a, trajectory feature 618b, trajectory feature 618c), however, it will be understood that fewer or more trajectory features 618 can be extracted and that the operations performed on the trajectory feature 618a, trajectory feature 618b, and trajectory feature 618c can similarly be performed on other trajectory features 618. With reference to the example trajectory features 618 illustrated in FIG. 6A, the trajectory feature 618a, trajectory feature 618b, and trajectory feature 618c, may correspond to a collision, velocity, and distance to destination trajectory features, respectively.

At steps 654a, 654b, 654c (collectively referred to as step 654), the planning system 404 combines the trajectory features 618a, 618b, 618c, respectively, with scene features 622. In this way, some or all of the scene features 622 can be combined with each of the trajectory features 618a, 618b, 618c. In some cases, the planning system 404 may combine the trajectory features 618 with the scene features 622 by concatenating the different features and/or concatenating the vectors that correspond to the different features.

As described herein, in some cases, the scene features 622 may not be combined with some or any trajectory features 618. For example, the planning system 404 may not extract scene features 622 for purposes of scoring the trajectories 614 and/or may not combine the scene features 622 with some of the trajectory features 618. In some such cases, some or all of steps 654a, 654b, 654c may be omitted.

At steps 656a, 656b, 656c (collectively referred to as step 656), the planning system 404 shapes the feature. In some cases, shaping the feature can include shaping the vector or data of the feature. In some cases, to shape the feature (or vector corresponding to the feature), the planning system 404 may perform one or more processing operations on the feature, including but not limited to normalizing the feature (vector), etc.

The results of shaping the features 618a, 618b, 618c may be individually communicated to one or more fully connected layer(s) 658a, 658b, 658c, respectively. Thus, the results of shaping feature 618a may pass through one or more fully connected layers 658a, results of shaping feature 618b may pass through one or more fully connected layers 658b, and the results of shaping feature 618c may pass through one or more fully connected layers 658c. Although not illustrated, it will be understood that one or more operations may be performed between different fully connected layers, such as but not limited to stacking features, self-attention, recurrent neural networks (e.g., LSTM (long short term memory)), etc.

The output of the fully connected layers(s) 658a, 658b, 658c may include feature scores 660a, 660b, 660c (collectively referred to as scores 660) for the features 618a, 618b, 618c, respectively. In some cases, the planning system 404 can include separate scoring heads to determine the scores 660a, 660b, 660c for the respective features 618a, 618b, 618c based on the output of the fully connected layers(s) 658a, 658b, 658c.

At step 662, the planning system 404 combines the feature scores 660 to generate a trajectory score 664. As described herein, the planning system 404 can combine the feature scores 660 in a number of ways. For example, the planning system 404 may determine a sum, average, or standard deviation of some or all of the feature scores 660. In some cases, the planning system 404 may select and/or combine a set of the highest or lowest feature scores 660. In certain cases, planning system 404 combines the feature scores 660 by concatenating them into a features score vector that includes a value for some or all of the feature scores 660.

In some cases, the planning system 404 may weight the feature scores 660. In certain cases, to weight the feature scores 660, the planning system 404 may use a weight vector that assigns a particular weight to the feature scores 660 in the features score vector. In some such cases, the planning system 404 can determine the trajectory score 664 using the dot product of the weight vector and the feature scores vector.

In some cases, the trajectory score 664 may be a value generated from the features score vector. In certain cases, the trajectory score 664 may be a vector.

Figure 7:
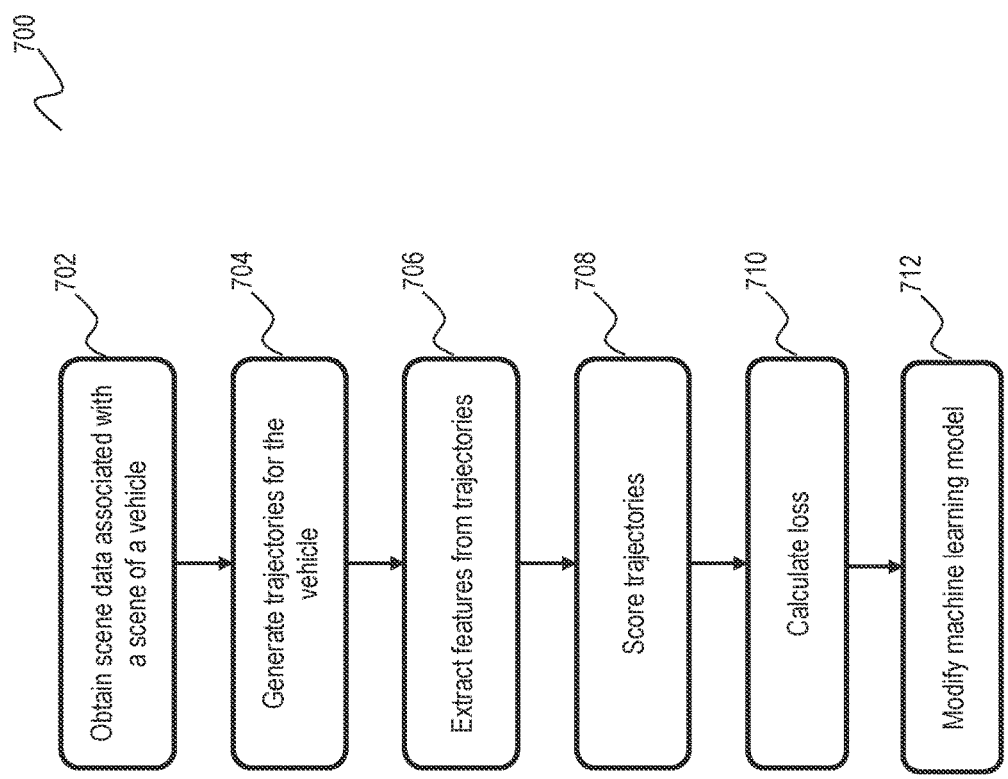
FIG. 7 is a flow diagram illustrating an example of a routine implemented by one or more processors to train a machine learning model.

FIG. 7 is a flow diagram illustrating an example of a routine 700 implemented by one or more processors to train a machine learning model. The flow diagram illustrated in FIG. 7 is provided for illustrative purposes only. It will be understood that one or more of the steps of the routine illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 702, the planning system 404 obtains scene data 502 associated with a scene of a vehicle 200. As described herein, the scene data 502 may include a semantic image and/or classifications of object within a vehicle scene. In some cases, the scene data 502 can be a set of scene data 502 selected from multiple sets of scene data 502 in training data 501. The sets of scene data 502 can correspond to distinct vehicle scenes, and the training data 501 can be collected over time and may include thousands, millions, or more sets of scene data 502.

In some cases, the scene data 502 may include a preset trajectory corresponding to a path that the vehicle 200 took through the vehicle scene at a previous time and/or a user-selected path through the vehicle scene.

At block 704, the planning system 404 generates trajectories for the vehicle based on the scene data 502. As described herein, the trajectories can be generated using the scene data 502. For example, the scene data 502 can indicate the location of objects within the vehicle scene, and the planning system 404 can generate the trajectories based on the location of the objects in the vehicle scene. In some cases, the planning system 404 generates the trajectories using a trajectory generation policy. As described herein, the trajectories can correspond to potential paths for the vehicle 200 through the vehicle scene.

The generated trajectories may include at least one primary trajectory and multiple secondary trajectories. It will be understood, however, that at the time of generation, the generated trajectories may not be identified as primary trajectories or secondary trajectories. For example, the trajectories may be generated and at a later time at least one trajectory may be identified as a primary trajectory.

At block 706, the planning system 404 extracts trajectory features from the generated trajectories. As described herein, the extracted trajectory features can be predefined or learned features. Predefined features may be extracted based on one or more instructions or processes. The learned features may be extracted using one or more machine learning models.

Extracting trajectory features from the generated trajectories may include extracting trajectory features from any primary trajectories and/or any secondary trajectories. In some such cases, the trajectories may not be identified as primary trajectories and/or secondary trajectories at the time of feature extraction. For example, the trajectory features may be extracted from the generated trajectories may and at a later time at least one of the trajectories may be identified as a primary trajectory.

At block 708, the planning system 404 scores (or ranks) the trajectories. As described herein, the planning system 404 can score the trajectories in a variety of ways. In some cases, the planning system 404 scores individual trajectory features and generates a trajectory score based on the scored trajectory features. In certain cases, the planning system 404 uses one or more machine learning models to score the features of a trajectory (and/or the trajectories). For example, some or all of the individual trajectory features can be processed and communicated to respective one or more fully connected layers of a neural network. The feature scores can correspond to the output of the fully connected layers.

The planning system can combine one or more feature scores to determine the trajectory score. For example, the planning system 404 can concatenate some or all of the feature scores to generate the trajectory score. In some such cases, the trajectory score may be a vector that includes values for the individual features scores. As another example, the trajectory score may correspond to an average, standard deviation, sum, minimum, maximum, of the feature scores. In some cases, the planning system 404 can weight the feature scores and use the (combined) weighted feature scores to generate the trajectory score.

Scoring the trajectories may include scoring any primary trajectories and/or any secondary trajectories. In some such cases, the trajectories may not be identified as primary trajectories and/or secondary trajectories at the time of scoring. For example, the trajectories may be scored (or ranked) from the generated trajectories may and at a later time at least one of the trajectories may be identified as a primary trajectory.

At block 710, the planning system 404 calculates a loss for one or more components of the planning system 404, such as the machine learning model used to score the features/trajectory. As described herein, in some cases, the loss can be based on a comparison of a score for a primary trajectory and the score for other trajectories (e.g., trajectories generated by the planning system 404). In certain cases, the loss is greater when the primary trajectory is ranked (or scored) lower than other trajectories and the loss is smaller when the primary trajectory is ranked (or scored) higher than other trajectories.

At some point prior to calculating the loss, the primary trajectory can be identified. For example, the primary trajectory may be identified concurrently with the generation of the trajectories, feature extraction, and/or scoring, or at any time prior to the loss calculation. In some cases, as described herein, the primary trajectory can be identified by the planning system 404 and/or a user that reviews the generated trajectories.

As described herein, in certain cases, the primary trajectory can correspond to a generated trajectory that is similar to a preset or expert trajectory. In certain cases, the primary trajectory corresponds to a generated trajectory (from the set of generated trajectories) that is (most) similar to the preset or expert trajectory. The set of trajectories may correspond to some or all of the trajectories generated by the planning system 404 from the scene data 502.

At block 712, the planning system 404 modifies one or more components based on the determined loss. In some cases, the determined loss is used to modify one or more parameters of the machine learning model used to generate the scores for the trajectory features and/or the trajectories. In certain cases, the parameters are modified to reduce the loss value or to have the loss value approach a particular value (e.g., zero or one). To do this, the planning system 404 can receive positive feedback if the loss decreases and negative feedback if the loss increases.

As the loss is tied to the ranking or score of the primary trajectory, the planning system 404 can modify the relevant parameters such that primary trajectories are ranked (or scored) higher than other trajectories (and other trajectories are ranked or scored lower). By training a machine learning model to rank primary trajectories higher, the training environment can indirectly train the machine learning model to follow preset or expert trajectories for different vehicle scenes. Moreover, the training environment can enable the machine learning model to modify its own parameters as it sees fit in order to reduce the loss. As part of this, the machine learning model can determine how to score and/or combine the trajectory features to determine trajectory scores for the trajectories that result in primary trajectories being ranked (or scored) higher than the other trajectories. Thus, the machine learning model can indirectly learn the relative importance of trajectory features in selecting a trajectory for a vehicle.

Fewer, more or different blocks can be included in the routine 700. In some cases, the routine can be repeated hundreds, thousands, or millions of times with different scene data 502 such that the machine learning model can be trained using diverse scene data 502 and better prepared to select a proper trajectory when encountering a scene on which the machine learning model was not trained. As the machine learning model is trained it can rank (or score) primary trajectories higher than other trajectories. In this way, the machine learning model may indirectly learn a vehicle planning policy by which the vehicle 200 can navigate various environments. For example, the machine learning model may indirectly learn how to score individual trajectory features, how to combine the trajectory features (e.g., which ones to user and/or how to weight them), and how to score trajectories such that trajectories similar to a preset or expert trajectory are ranked (or scored) higher than other trajectories (and selected for use in navigating the vehicle 200.

Figure 8:
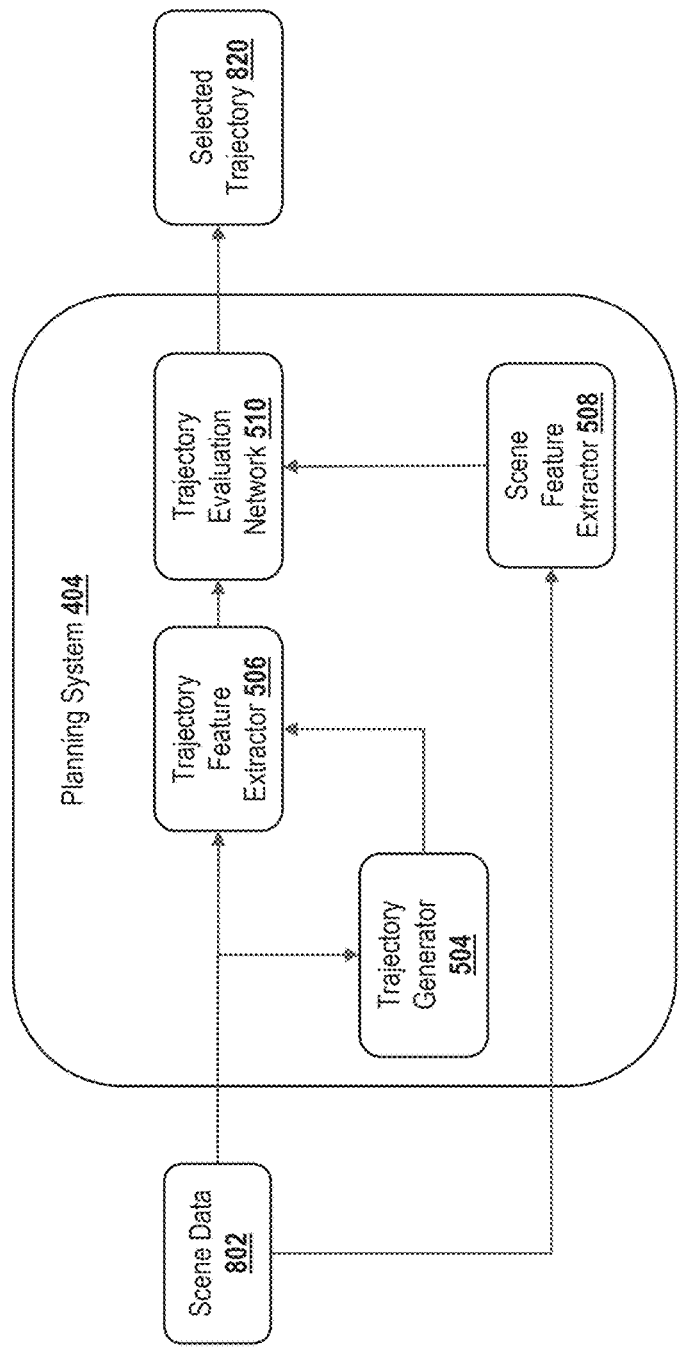
FIG. 8 is a block diagram illustrating an inference environment for a planning system.

FIG. 8 is a block diagram illustrating an inference environment 800 for a planning system 404. In the illustrated inference environment 800, the planning system 404 uses scene data 802 to select a trajectory 820 for a vehicle 200. The scene data 802 may be similar to the scene data 502. For example, the scene data 802 can include sensor data from a sensor suite and/or a semantic image (e.g., a semantic image generated by a perception system 402. As described herein, the scene data may include vehicle data associated with the vehicle 200 and/or object data associated with one or more objects in a vehicle scene. The scene data 802 may be generated from sensor data from one or more sensors associated with a sensor suite of the perception system 402, sensor data from the localization system 406, and/or one or more sensors in or around the vehicle 200 that are specific to the vehicle 200. The scene data 802 include data related to the position, orientation, heading, velocity, acceleration, of the vehicle 200 or objects in the scene, the amount of acceleration or deceleration of the vehicle 200, steering wheel position of the vehicle 200, etc. As another example, the scene data 802 may include semantic data or a semantic image that include classifications of feature extractions of objects in the vehicle scene.

In the inference environment 800, the scene data 802 may be real time data generated by one or more sensors or a perception system 402 as the vehicle 200 operates in various environment. Accordingly, the scene data 802 can correspond to active vehicle scenes as the vehicle 200 encounters them. In this way, the scene data 802 may be different from the scene data 502 as the scene data 502 in some cases may be historical data corresponding to previous scenes encountered by a vehicle 200.

The planning system 404 can be similar to the planning system 404 described herein at least with reference to FIG. 4, FIG. 5A, FIG. 6A, and FIG. 6B. In the illustrated example, the planning system 404 includes the same or similar components to the planning system 404 described herein with reference to FIG. 5A. Specifically, the planning system 404 includes a trajectory generator trajectory generator 504, trajectory feature extractor 506, scene feature extractor 508, and trajectory evaluation network 510. As described herein, the planning system 404 may include fewer or more components as desired. For example, in some cases, the planning system 404 may omit scene feature extractor 508.

In some cases, the components of the planning system 404 in the inference environment 800 may be different than the components of the planning system 404 in the training environment 600. In certain cases, the components of the planning system 404 in the inference environment 800 may be (more) trained relative to the components of the planning system 404 in the inference environment 600. For example, as described herein, in the training environment 600 one or more components of the planning system 404 are being trained such that one or more parameters of the one or more components may be modified or adjusted during the training. In the inference environment 800 the components of the planning system 404 may be trained and/or relatively static (e.g., the parameters that were being changed in the training environment 600 are not being change in the inference environment 800). However, it will be understood that one or more parameters of the components of the planning system 404 in the 800 may be adjusted.

In the inference environment 800, the components of the planning system 404 can perform the functions as described herein. As non-limiting examples, the trajectory generator 504 can generate one or more trajectories, the trajectory feature extractor 506 can extract trajectory features from the generated trajectories, the scene feature extractor 508 can extract scene features using the scene data 802, and the trajectory evaluation network 510 can evaluate the trajectory features and/or trajectories to determine a score and/or ranking for the trajectory features and/or trajectories.

As described herein, the trajectory evaluation network 510 can evaluate the individual trajectories in the trajectory space. For example, the trajectory evaluation network 510 can evaluate the trajectory as a whole (or after generation) rather than evaluating each incremental decision made by the 504 in a state-action space to incrementally build the trajectory. In this way, the trajectory evaluation network 510 may generate less data and/or use less data to evaluate individual trajectories. Generating or using less data to evaluate individual trajectories can improve the overall functionality of the planning system 404 by reducing the compute resources used to generate/evaluate individual trajectories, thereby decreasing the amount of time used to generate/evaluate individual trajectories and/or enabling the planning system 404 to generate/evaluate more trajectories within the same amount of time. Using fewer compute resources and/or reducing the processing time to evaluate and select a trajectory for the vehicle 200 can enable the vehicle 200 to spend compute resources on other tasks and/or increase the likelihood that the vehicle 200 is able to properly analyze a larger number of trajectories, thereby increasing the likelihood that the vehicle 200 selects an optimal trajectory for a given scene.

In the inference environment 800, at least one of the evaluated trajectories can be selected to control the vehicle 200 In some cases, the trajectory that has the highest score or is highest ranked by the trajectory evaluation network 510 may be selected to control the vehicle 200. In some cases, the trajectory evaluation network 510 can identify the selected trajectory. In certain cases, another component of the planning system 404 can select the trajectory based on the rankings or scores received from the trajectory evaluation network 510.

The vehicle 200 can use the selected trajectory 820 to navigate through the scene. In some cases, the control system 408 may use the trajectory 820 to select certain control parameters (e.g., accelerator, brake, wheel control, etc.) to control the vehicle 200 to follow the trajectory 820. As the vehicle 200 is controlled, information can be collected about the actual trajectory versus the trajectory 820. This information may be used to determine a loss and/or better understand the kinematics of the vehicle 200.

In some cases, one distinction between the planning system 404 in the training environment 600 and the inference environment 800 may be that in the inference environment 800, the planning system 404 may not receive a loss (and/or adjust parameters of the trajectory evaluation network 510 or machine learning model based on the loss). For example, the inference environment 800 may not include a processing device that calculates a loss and provides it back to the trajectory evaluation network 510. However, it will be understood that, in certain cases, a processing device of the planning system 404 may calculate a loss and/or provide it to the trajectory evaluation network 510.

Figure 9:
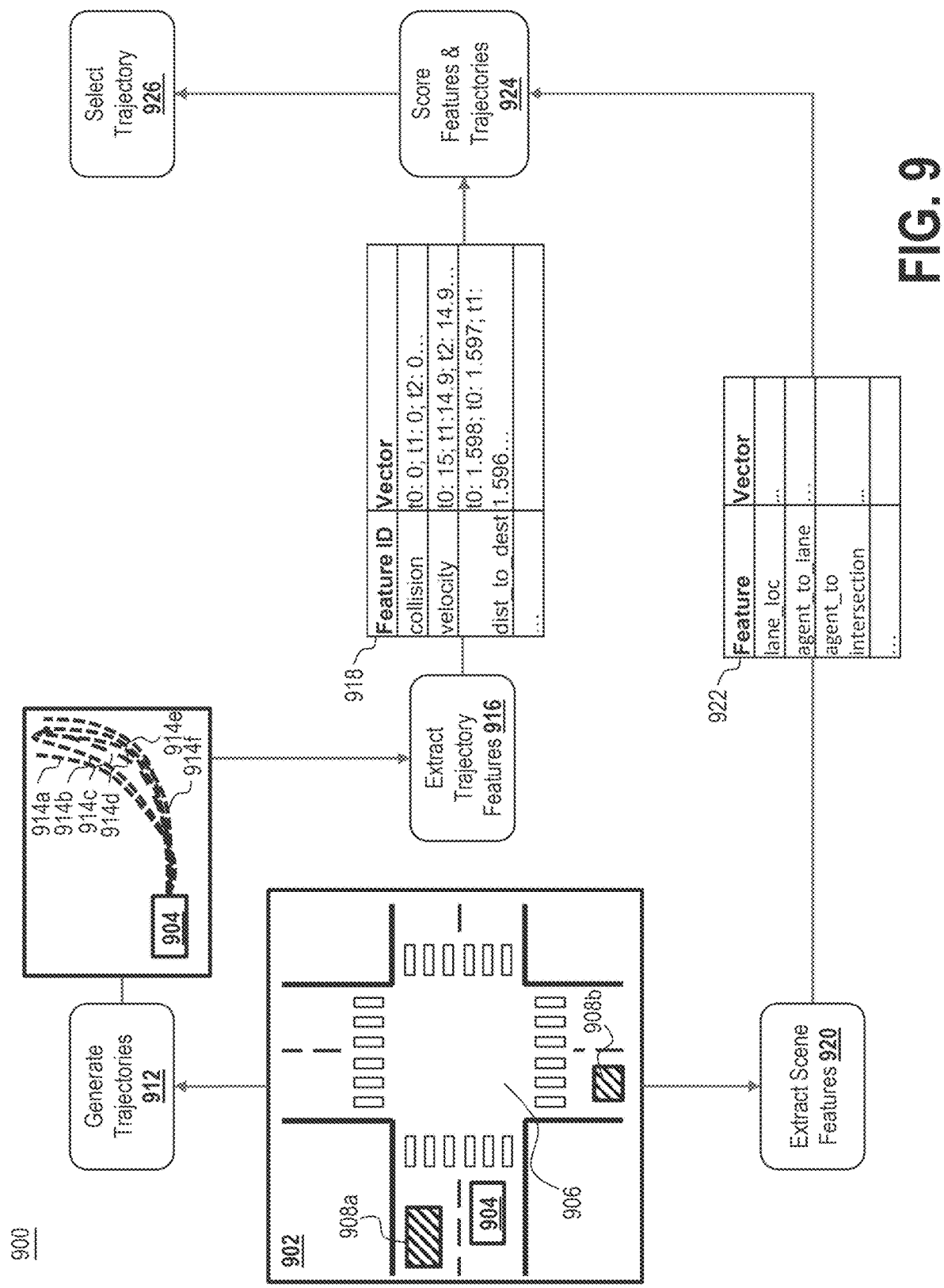
FIG. 9 is a data flow diagram illustrating an example of an inference environment in which a planning system is operating to plan a trajectory for a vehicle.

FIG. 9 is a data flow diagram illustrating an example of an inference environment 900 in which a planning system 404 is operating to plan a trajectory for a vehicle 200. In the illustrated example, the planning system 404 uses scene data 502 corresponding to a vehicle scene 902 to score trajectory features and trajectories (924) and select a trajectory (928) (also referred to herein as a selected trajectory or first trajectory) to control the vehicle 200. The inference environment 900 can be similar to the inference environment 800 and may include one or more of the components of the inference environment 800.

For simplicity of explanation, the vehicle scene 902 may be similar to vehicle scene 602 from FIG. 6A, however, it will be understood that the scenes encountered by the vehicle 200 during inference may be different than the scenes used to train the planning system 404 (e.g., one or more components of the planning system 404).

In the illustrated example, the vehicle scene 902 includes an ego vehicle 904 making a left turn at an intersection 906. The vehicle scene 902 further includes two vehicle agents 908a, 908b (individually or collectively referred to as agents 908). One distinction between the vehicle scene 902 and vehicle scene 602 is that the preset trajectory 610 is not shown in the vehicle scene 902. As described herein, the preset trajectory 610 can form part of the training data 501 (or scene data 502 of the training data 501) and be used to select a primary trajectory 614c. However, in an inference environment, the preset trajectory 610 may (or does) not exist and/or the primary trajectory 614c may not be (or is not) selected (or known).

At 912, the planning system 404 generates trajectories 914a-914f (collectively referred to as trajectories 914) similar to what is described herein at least with reference to step 612 of FIG. 6A. In the inference environment 900, as the planning system 404 does not have a preset trajectory 610, it may not be able to select a primary trajectory 614c from the trajectories 914 (or calculate an error based on a primary trajectory 614c). As such, at 912, all of the trajectories 914 may be considered equally for selection as the selected trajectory.

At 916, the planning system 404 extracts trajectory features 918 from the trajectories 914 as described herein at least with reference to step 616 of FIG. 6A.

At 920, the planning system 404 extracts scene features 922 using the scene data 502 of the vehicle scene 902 as described herein at least with reference to step 620 of FIG. 6A. As described herein, in some cases, step 920 may be omitted, and the scene features 922 may not be generated.

At 924, the planning system 404 scores features and trajectories using the trajectory features 918 (and in some cases scene features 922) and a machine learning model (e.g., trajectory evaluation network 510) as described herein at least with reference to step 614 of FIG. 6A and FIG. 6B. For example, the planning system 404 may separate the trajectory features 918, combine them with the scene features 922, shape the features, communicate the shaped features to fully connected layers, and combine one or more feature scores from the fully connected layers to generate a trajectory score. Moreover, the planning system 404 may rank the trajectories 914 using the trajectory scores assigned to them by the trajectory evaluation network 510.

As described herein, the planning system 404 may evaluate (and score) the trajectories 914 and trajectory features 918 in a trajectory space thereby reducing the amount of data processing and/or increasing the evaluation (or scoring) time for the trajectories 914 and/or trajectory features 918.

At 926, the planning system 404 selects a trajectory from the trajectories 914 for use in controlling the vehicle 200. As described herein, the planning system 404 may select the trajectory with a high (e.g., top quartile), or highest, score or ranking to control the vehicle 200. Based on the training of the planning system 404, the selected trajectory is preferably a trajectory that would correspond to a primary trajectory (or preset or expert trajectory) had a primary trajectory been selected from the trajectories 914 or had a preset trajectory existed in the scene data 502 for the vehicle scene 902.

Figure 10:
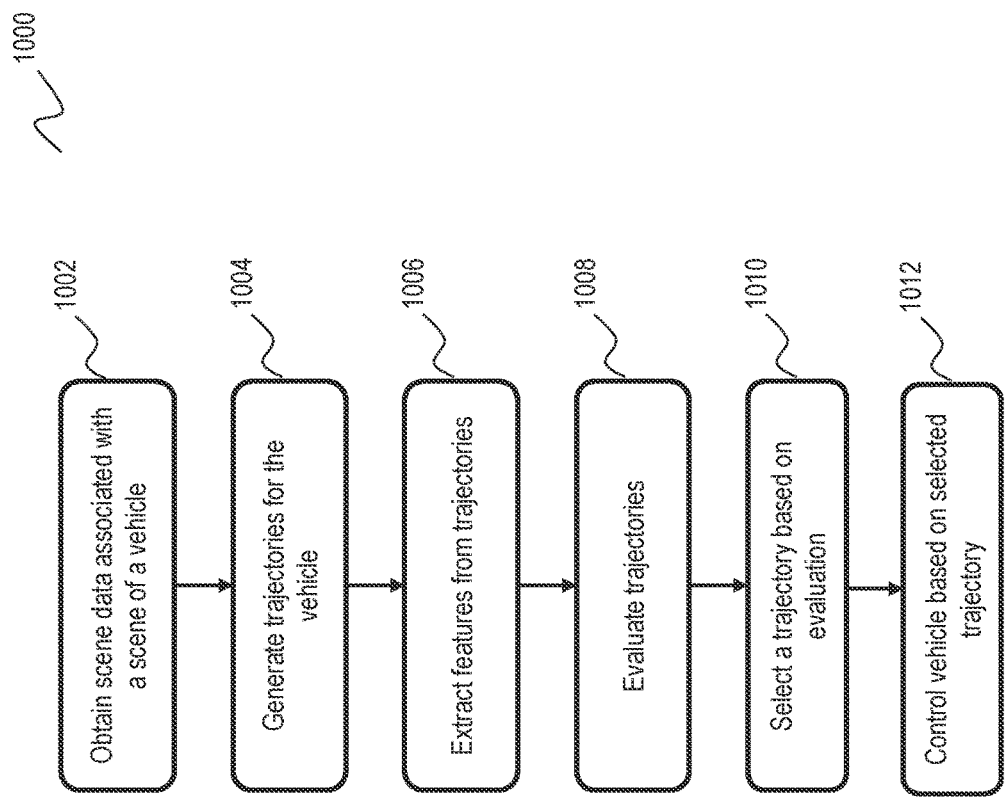
FIG. 10 is a flow diagram illustrating an example of a routine implemented by one or more processors to select a trajectory for controlling a vehicle.

FIG. 10 is a flow diagram illustrating an example of a routine 1000 implemented by one or more processors to select a (first) trajectory for controlling a vehicle 200. The flow diagram illustrated in FIG. 10 is provided for illustrative purposes only. It will be understood that one or more of the steps of the routine illustrated in FIG. 10 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1002, the planning system 404 obtains scene data associated with a scene of vehicle 200 as described herein at least with reference to block 702 of FIG. 7. In some cases, the scene data received at 1002 is real-time scene data generated using sensor data obtained from sensors as a vehicle 200 operates in an environment. In certain cases, the scene data received at 1002 does not include a preset trajectory.

At block 1004, the planning system 404 generates trajectories for the vehicle based on the scene data 502 as described herein at least with reference to block 704 of FIG. 7.

At block 1006, the planning system 404 extracts trajectory features from the generated trajectories as described herein at least with reference to block 706 of FIG. 7. This can include the extraction of features from a particular trajectory.

At block 1008, the planning system 404 evaluates the trajectories (and/or a particular trajectory). In certain cases, the planning system 404 may evaluate the trajectories (or a particular trajectory) in a trajectory space. For example, the planning system 404 may evaluate completed trajectories or trajectories (or a particular trajectory) that span a particular time duration (e.g., six seconds) instead of evaluating the trajectories as they are being generated or along multiple points during the generation phase.

In some cases, the planning system 404 scores (or ranks) the trajectories as described herein at least with reference to block 708 of FIG. 7. For example, the planning system 404 may evaluate (and score) individual trajectory features (e.g., using a machine learning model) and use the evaluation (or scores) of the individual trajectory features to evaluate (and score) the corresponding trajectory. Moreover, based on a (learned) vehicle planning policy, the planning system 404 may score (or rank) the different trajectories.

At block 1010, the planning system 404 selects a trajectory based on the evaluation of the trajectories (including an evaluation of a particular trajectory). As described herein, the planning system 404 may select a (first) trajectory based on its score and/or rank relative to the score (or rank) of other trajectories. In some cases, the planning system 404 selects a (first) trajectory with a higher score (e.g., top quartile, top ten percent, etc.) or highest score. In some cases, the planning system 404 may select the particular trajectory (e.g., the score for the particular trajectory may be the highest and/or satisfy a score threshold) or the planning system 404 may select a different trajectory (e.g., the score for the particular trajectory does not satisfy the score threshold and/or is not the highest).

At block 1012, the planning system 404 causes the vehicle to be controlled based on the selected trajectory. As described herein, the planning system 404 may communicate the selected trajectory to the control system 408, which may adjust one or more control parameters to cause the vehicle 200 to move in a manner that (approximately) tracks the selected trajectory.

Fewer, more, or different blocks can be included in the routine 1000 and/or the blocks can be reordered. In some cases, the routine can be repeated hundreds, thousands, or millions of times as the vehicle 200 operates. For example, the routine 1000 may occur multiple times a second while a vehicle 200 is in operation.

In certain cases, the vehicle 200 may collect data as it operates. The data may include scene data 502 and may be used at a later time to further train the planning system 404. For example, using the scene data 502 collected during operation of routine 1000, a preset trajectory and primary trajectory may be identified and the planning system 404 trained according to the preset trajectory and primary trajectory as described herein.

In some cases, routine 700 and routine 1000 may be performed iteratively. For example, the planning system 404 may be trained in accordance with routine 700 and then operate in a vehicle 200 in accordance with routine 1000. After operating for a period of time, the planning system 404 may be further trained or retrained in accordance with routine 700 using additional scene data, some of which, may be collected during operation of the planning system 404 in an inference environment (e.g., during execution of routine 1000).

EXAMPLES

Various example embodiments of the disclosure can be described by the following clauses:

Clause 1. A method, comprising: obtaining scene data associated with a scene of a vehicle; generating a plurality of trajectories for the vehicle based on the scene data; extracting a plurality of features from a particular trajectory of the plurality of trajectories; evaluating, using a machine learning model, the particular trajectory in a trajectory space based on the plurality of features and a vehicle planning policy; selecting a first trajectory from the plurality of trajectories based on the evaluating the particular trajectory; and causing the vehicle to be controlled based on the first trajectory.

Clause 2. The method of clause 1, wherein the trajectory space includes a complete trajectory.

Clause 3. The method of any of clauses 1 or 2, wherein obtaining the scene data includes receiving at least one of map data associated with a map corresponding to the scene, route data associated with a route for the vehicle, object data associated with at least one object identified in the scene, location data associated with a location of the vehicle.

Clause 4. The method of any of clauses 1-3, wherein generating the plurality of trajectories comprises simulating a plurality of groups of actions to perform in sequence.

Clause 5. The method of clause 4, wherein the groups of actions comprise at least one of accelerating, modifying a heading, decelerating, or maintaining velocity.

Clause 6. The method of any of clauses 1-5, wherein the machine learning model is a first machine learning model, the method further comprising: generating an image based on the scene data; determining a second plurality of features from the image using a second machine learning model; and combining the first plurality of features with the second plurality of features, wherein evaluating the particular trajectory based on the plurality of features and a vehicle planning policy comprises: determining a first feature score for each of the first plurality of features, determining a second feature score for each of the second plurality of features, and determining a trajectory score for the particular trajectory based on the plurality of first feature scores and the plurality of second feature scores.

Clause 7. The method of clause 6, wherein the image is a birds-eye-view image.

Clause 8. The method of any of clauses 1-7, wherein evaluating the particular trajectory comprises: determining a feature score for each feature of the plurality of features, and combining the plurality of feature scores to determine a trajectory score for the particular trajectory.

Clause 9. The method of 1-8, wherein evaluating the particular trajectory comprises: determining a feature score for each feature of the plurality of features, weighting each of the plurality of feature scores, and combining the plurality of weighted feature scores to determine a trajectory score for the particular trajectory.

Clause 10. A system, comprising: a data store storing computer-executable instructions; and a processor configured to execute the computer-executable instructions, wherein execution of the computer-executable instructions causes the system to: obtain scene data associated with a scene of a vehicle; generate a plurality of trajectories for the vehicle based on the scene data; extract a plurality of features from a particular trajectory; evaluate, using a machine learning model, the particular trajectory in a trajectory space based on the plurality of features and a vehicle planning policy; select a first trajectory from the plurality of trajectories based on the evaluation of the particular trajectory; and cause the vehicle to be controlled based on the first trajectory.

Clause 11. The system of clause 10, wherein the trajectory space includes a completed trajectory.

Clause 12. The system of any of clauses 10 or 11, wherein to evaluate the particular trajectory, execution of the computer-executable instructions further cause the system to: determine a feature score for each feature of the plurality of features, and combine the plurality of feature scores to determine a trajectory score for the particular trajectory.

Clause 13. The system of any of clauses 10-12, wherein to evaluate the particular trajectory, execution of the computer-executable instructions further cause the system to: determine a feature score for each feature of the plurality of features, weight each of the plurality of feature scores, and combine the plurality of weighted feature scores to determine a trajectory score for the particular trajectory.

Clause 14. The system of any of clauses 10-13, wherein the machine learning model is a first machine learning model, wherein execution of the computer-executable instructions causes the system to: generate an image based on the scene data; determine a second plurality of features from the image using a second machine learning model; and combine the first plurality of features with the second plurality of features, wherein to evaluate the particular trajectory based on the plurality of features and a vehicle planning policy, the computer-executable instructions further cause the system to: determine a first feature score for each of the first plurality of features, determine a second feature score for each of the second plurality of features, and determine a trajectory score for the particular trajectory based on the plurality of first feature scores and the plurality of second feature scores.

Clause 15. Non-transitory computer-readable media comprising computer-executable instructions that, when executed by a computing system, causes the computing system to: obtain scene data associated with a scene of a vehicle; generate a plurality of trajectories for the vehicle based on the scene data; extract a plurality of features from a particular trajectory; evaluate, using a machine learning model, the particular trajectory in a trajectory space based on the plurality of features and a vehicle planning policy; select a first trajectory from the plurality of trajectories based on the evaluation of the particular trajectory; and cause the vehicle to be controlled based on the first trajectory.

Clause 16. The non-transitory computer-readable media of clause 15, wherein the trajectory space includes a completed trajectory.

Clause 17. The non-transitory computer-readable media of any of clauses 15 or 16, wherein to evaluate the particular trajectory, execution of the computer-executable instructions further cause the computing system to: determine a feature score for each feature of the plurality of features, and combine the plurality of feature scores to determine a trajectory score for the particular trajectory.

Clause 18. The non-transitory computer-readable media of any of clauses 15-17, wherein to evaluate the particular trajectory, execution of the computer-executable instructions further cause the computing system to: determine a feature score for each feature of the plurality of features, weight each of the plurality of feature scores, and combine the plurality of weighted feature scores to determine a trajectory score for the particular trajectory.

Clause 19. The non-transitory computer-readable media of any of clauses 15-18, wherein the machine learning model is a first machine learning model, wherein execution of the computer-executable instructions causes the computing system to: generate an image based on the scene data; determine a second plurality of features from the image using a second machine learning model; and combine the first plurality of features with the second plurality of features, wherein to evaluate the particular trajectory based on the plurality of features and a vehicle planning policy, the computer-executable instructions further cause the system to: determine a first feature score for each of the first plurality of features, determine a second feature score for each of the second plurality of features, and determine a trajectory score for the particular trajectory based on the plurality of first feature scores and the plurality of second feature scores.

Clause 20. The non-transitory computer-readable media of clause 19, wherein the image is a birds-eye-view image.

Clause 21. A method, comprising: obtaining scene data associated with a scene of a vehicle; generating a plurality of trajectories for the vehicle based on the scene data, the plurality of trajectories including at least one primary trajectory and a plurality of secondary trajectories; extracting a first plurality of features from the at least one primary trajectory and a second plurality of features from at least one secondary trajectory of the plurality of secondary trajectories; generating, using a machine learning model, a first trajectory score for the at least one primary trajectory and a second trajectory score for the at least one secondary trajectory based on the first plurality of features and the second plurality of features; generating a loss for the machine learning model based on the first trajectory score and the second trajectory score for the at least one secondary trajectory; and modifying one or more parameters of the machine learning model based on the generated loss.

Clause 22. The method of clause 21, wherein the scene data comprises a set of scene data selected from training data, wherein the training data comprises a plurality of sets of scene data.

Clause 23. The method of any of clauses 21 or 22, wherein the primary trajectory is a trajectory of the plurality of trajectories that is determined to be most similar to a preset trajectory, wherein the preset trajectory corresponds to a path through the scene of the vehicle that is selected by a user.

Clause 24. The method of any of clauses 21-23, wherein the primary trajectory is a trajectory of the plurality of trajectories that is determined to be most similar to a preset trajectory, wherein the preset trajectory corresponds to a path previously traveled by a vehicle through the scene of the vehicle.

Clause 25. The method of clause 24, wherein the primary trajectory is determined to be most similar to the preset trajectory based on a comparison of a plurality of features of the preset trajectory with a corresponding plurality of features of the primary trajectory and the plurality of secondary trajectories.

Clause 26. The method of clause 1, wherein the scene data comprises a semantic segmentation image.

Clause 27. The method of clause 6, wherein the scene data comprises at least one feature of at least one object in the scene of the vehicle, wherein the at least one feature comprises at least one of an orientation, position, velocity, acceleration, or object classification of the at least one object.

Clause 28. The method of clause 7, wherein generating the plurality of trajectories comprises generating the plurality of trajectories based on the at least one object in the scene of the vehicle and the at least one feature of the at least one object in the scene of the vehicle.

Clause 29. The method of clause 1, wherein generating the first trajectory score comprises: generating, using the machine learning model, a first feature score for each of the first plurality of features, and generating the first trajectory score based on the plurality of first feature scores, wherein generating the second trajectory score comprises: generating, using the machine learning model, a second feature score for each of the first plurality of features, and generating the second trajectory score based on the plurality of second feature scores.

Clause 30. The method of clause 9, wherein the plurality of first feature scores are weighted and the plurality of second feature scores are weighted.

Clause 31. The method of clause 9, wherein generating the first trajectory score based on the plurality of first feature scores comprises combining the plurality of first feature scores, and wherein generating the second trajectory score based on the plurality of second feature scores comprises combining the plurality of second feature scores.

Clause 32. The method of clause 1, wherein the loss for the machine learning model is greater when the first trajectory score is lower than the second trajectory score and the loss for the machine learning model is smaller when the first trajectory score is higher than the second trajectory score.

Clause 33. The method of clause 1, wherein modifying the one or more parameters of the machine learning model comprises adjusting at least one coefficient of the machine learning model to increase the first trajectory score.

Clause 34. A system, comprising: a data store storing computer-executable instructions; and a processor configured to execute the computer-executable instructions, wherein execution of the computer-executable instructions causes the system to: obtain scene data associated with a scene of a vehicle; generate a plurality of trajectories for the vehicle based on the scene data, the plurality of trajectories including at least one primary trajectory and a plurality of secondary trajectories; extract a first plurality of features from the at least one primary trajectory and a second plurality of features from at least one secondary trajectory of the plurality of secondary trajectories; generate, using a machine learning model, a first trajectory score for the at least one primary trajectory and a second trajectory score for the at least one secondary trajectory based on the first plurality of features and the second plurality of features; generate a loss for the machine learning model based on the first trajectory score and the second trajectory score for the at least one secondary trajectory; and modify one or more parameters of the machine learning model based on the generated loss.

Clause 35. The system of clause 14, wherein the scene data comprises a set of scene data selected from training data, wherein the training data comprises a plurality of sets of scene data.

Clause 36. The system of clause 14, wherein the primary trajectory is a trajectory of the plurality of trajectories that is determined to be most similar to a preset trajectory, wherein the preset trajectory corresponds to a path previously traveled by a vehicle through the scene of the vehicle.

Clause 37. The system of clause 16, wherein the primary trajectory is determined to be most similar to the preset trajectory based on a comparison of a plurality of features of the preset trajectory with a corresponding plurality of features of the primary trajectory and the plurality of secondary trajectories.

Clause 38. The system of clause 14, wherein generating the first trajectory score comprises: generating, using the machine learning model, a first feature score for each of the first plurality of features, and generating the first trajectory score based on the plurality of first feature scores, wherein generating the second trajectory score comprises: generating, using the machine learning model, a second feature score for each of the first plurality of features, and generating the second trajectory score based on the plurality of second feature scores.

Clause 39. The system of clause 18, wherein the plurality of first feature scores are weighted and the plurality of second feature scores are weighted.

Clause 40. Non-transitory computer-readable media comprising computer-executable instructions that, when executed by a computing system, causes the computing system to: obtain scene data associated with a scene of a vehicle; generate a plurality of trajectories for the vehicle based on the scene data, the plurality of trajectories including at least one primary trajectory and a plurality of secondary trajectories; extract a first plurality of features from the at least one primary trajectory and a second plurality of features from at least one secondary trajectory of the plurality of secondary trajectories; generate, using a machine learning model, a first trajectory score for the at least one primary trajectory and a second trajectory score for the at least one secondary trajectory based on the first plurality of features and the second plurality of features; generate a loss for the machine learning model based on the first trajectory score and the second trajectory score for the at least one secondary trajectory; and modify one or more parameters of the machine learning model based on the generated loss.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
    obtaining scene data associated with a scene of a vehicle;
    generating a plurality of trajectories for the vehicle based on the scene data;
    extracting a plurality of trajectory features from a particular trajectory of the plurality of trajectories;
    generating an image using the scene data;
    determining a plurality of scene features from the image using a first machine learning model;
    determining feature scores for individual features of the plurality of trajectory features, wherein the feature score of an individual feature is determined based at least on:
        combining the individual feature with at least a portion of the plurality of scene features to result in a combined feature set; and
        applying a portion of a second machine learning model to the combined feature set including the individual feature and the at least a portion of the plurality of scene features to generate the feature score for the individual feature;
    wherein distinct portions of the second machine learning model are trained and used to separately process distinct features of the plurality of trajectory features; and
    wherein determining feature scores for individual features of the plurality of trajectory features includes determining distinct feature scores for at least two individual features of the plurality of trajectory features, each distinct feature score based at least in part on a respective individual feature combined with at least a portion of the plurality of scene features;
    determining a trajectory score for the particular trajectory based on the feature scores for individual features of the plurality of trajectory features;
    selecting a first trajectory from the plurality of trajectories based on the trajectory score; and
    causing the vehicle to be controlled based on the first trajectory.

2. The method of claim 1, wherein the plurality of trajectories includes a completed trajectory.

3. The method of claim 1, wherein obtaining the scene data includes receiving at least one of map data associated with a map corresponding to the scene, route data associated with a route for the vehicle, object data associated with at least one object identified in the scene, location data associated with a location of the vehicle.

4. The method of claim 1, wherein generating the plurality of trajectories comprises simulating a plurality of groups of actions to perform in sequence.

5. The method of claim 4, wherein the groups of actions comprise at least one of accelerating, modifying a heading, decelerating, or maintaining velocity.

6. The method of claim 1, wherein evaluating the particular trajectory comprises:
    determining a feature score for each feature of the plurality of features,
    weighting each of the plurality of feature scores, and combining the plurality of weighted feature scores to determine a trajectory score for the particular trajectory.

7. The method of claim 1, wherein the image is a birds-eye-view image.

8. The method of claim 1, wherein evaluating the particular trajectory comprises:
determining a feature score for each feature of the plurality of features, and
combining the plurality of feature scores to determine a trajectory score for the particular trajectory.

9. A system, comprising:
a data store storing computer-executable instructions; and
a processor configured to execute the computer-executable instructions, wherein execution of the computer-executable instructions causes the system to:
obtain scene data associated with a scene of a vehicle;
generate a plurality of trajectories for the vehicle based on the scene data;
extract a plurality of trajectory features from a particular trajectory;
generate an image using the scene data;
determine a plurality of scene features from the image using a first machine learning model;
determine feature scores for individual features of the plurality of trajectory features, wherein the feature score of an individual feature is determined based at least on instructions to:
combine the individual feature with at least a portion of the plurality of scene features to result in a combined feature set; and
apply a portion of a second machine learning model to the combined feature set including the individual feature and the at least a portion of the plurality of scene features to generate the feature score for the individual feature;
wherein distinct portions of the second machine learning model are trained and used to separately process distinct features of the plurality of trajectory features; and
wherein determining feature scores for individual features of the plurality of features includes determining distinct feature scores for at least two individual features of the plurality of features, each distinct feature score based at least in part on a respective individual feature combined with at least a portion of the plurality of scene features;
determining a trajectory score for the particular trajectory based on feature scores for individual features of the plurality of trajectory features;
select a first trajectory from the plurality of trajectories based on the trajectory score; and
cause the vehicle to be controlled based on the first trajectory.

10. The system of claim 9, wherein to evaluate the particular trajectory, execution of the computer-executable instructions further cause the system to:
determine a feature score for each feature of the plurality of features,
weight each of the plurality of feature scores, and
combine the plurality of weighted feature scores to determine a trajectory score for the particular trajectory.

11. The system of claim 9, wherein the plurality of trajectories includes a completed trajectory.

12. The system of claim 9, wherein to evaluate the particular trajectory, execution of the computer-executable instructions further cause the system to:
determine a feature score for each feature of the plurality of features, and
combine the plurality of feature scores to determine a trajectory score for the particular trajectory.

13. Non-transitory computer-readable media comprising computer-executable instructions that, when executed by a computing system, causes the computing system to:
obtain scene data associated with a scene of a vehicle;
generate a plurality of trajectories for the vehicle based on the scene data;
extract a plurality of trajectory features from a particular trajectory;
generate an image using the scene data;
determine a plurality of scene features from the image using a first machine learning model;
determine feature scores for individual features of a plurality of trajectory features, wherein the feature score of an individual feature is determined based on instructions to:
combine the individual feature with at least a portion of the plurality of scene features to result in a combined feature set; and
apply a portion of a second machine learning model to the combined feature set including the individual feature and the at least a portion of the plurality of scene features to generate the feature score for the individual feature;
wherein distinct portions of the second machine learning model are trained and used to separately process distinct features of the plurality of trajectory features; and
wherein determining feature scores for individual features of the plurality of trajectory features includes determining distinct feature scores for at least two individual features of the plurality of trajectory features, each distinct feature score based at least in part on a respective individual feature combined with at least a portion of the plurality of scene features;
determine a trajectory score for the particular trajectory based on feature scores for individual features of the plurality of trajectory features;
select a first trajectory from the plurality of trajectories based on the trajectory score; and
cause the vehicle to be controlled based on the first trajectory.

14. The non-transitory computer-readable media of claim 13, wherein to evaluate the particular trajectory, execution of the computer-executable instructions further cause the computing system to:
determine a feature score for each feature of the plurality of features,
weight each of the plurality of feature scores, and
combine the plurality of weighted feature scores to determine a trajectory score for the particular trajectory.

15. The non-transitory computer-readable media of claim 13, wherein the image is a birds-eye-view image.

16. The non-transitory computer-readable media of claim 13, wherein the plurality of trajectories includes a completed trajectory.

17. The non-transitory computer-readable media of claim 13, wherein to evaluate the particular trajectory, execution of the computer-executable instructions further cause the computing system to:
determine a feature score for each feature of the plurality of features, and combine the plurality of feature scores to determine a trajectory score for the particular trajectory.

* * * * *